(12) United States Patent
Coppola et al.

(10) Patent No.: US 12,077,462 B2
(45) Date of Patent: Sep. 3, 2024

(54) LAMINATED GLASS RIBBONS AND APPARATUSES FOR FORMING LAMINATED GLASS RIBBONS

(71) Applicant: Corning Incorporated, Corning, NY (US)

(72) Inventors: Frank Coppola, Horseheads, NY (US); Vladislav Yuryevich Golyatin, Avon (FR); Monica Jo Mashewske, Lexington, NC (US); Jae Hyun Yu, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/988,130

(22) Filed: Nov. 16, 2022

(65) Prior Publication Data

US 2023/0076980 A1  Mar. 9, 2023

Related U.S. Application Data

(62) Division of application No. 15/777,543, filed as application No. PCT/US2016/062386 on Nov. 17, 2016, now Pat. No. 11,530,153.

(60) Provisional application No. 62/258,160, filed on Nov. 20, 2015.

(51) Int. Cl.
*C03B 17/06* (2006.01)
*B32B 17/06* (2006.01)
*C03B 17/02* (2006.01)

(52) U.S. Cl.
CPC ............ *C03B 17/064* (2013.01); *B32B 17/06* (2013.01); *C03B 17/02* (2013.01); *Y02P 40/57* (2015.11)

(58) Field of Classification Search
None
See application file for complete search history.

(56) References Cited

U.S. PATENT DOCUMENTS 3,451,798 A * 6/1969 Simon ................... C03B 17/064
65/121
3,537,834 A 11/1970 Simon
3,737,294 A 6/1973 Dumbaugh et al.
(Continued)

FOREIGN PATENT DOCUMENTS

CN 1780797 A 5/2006
JP 2013-184876 A 9/2013
(Continued)

*Primary Examiner* — Jodi C Franklin
(74) *Attorney, Agent, or Firm* — Daniel J. Greenhalgh

(57) ABSTRACT

Apparatuses for making a laminated glass ribbon may include an upper forming body including an outer forming surface bounded by a pair of upper dams, and a lower forming body disposed downstream of the upper forming body and including an outer forming surface spaced from the outer forming surface of the upper forming body by an interior gap. An edge guide may be disposed along an interior upper dam wall and spaced apart in the interior gap from the lower forming body. Surfaces exterior to the outer forming surfaces of the upper and lower forming bodies may abut and be joined. A formed glass ribbon having a core glass layer and a pair of clad glass layers may include inner and outer portions that have substantially equal thickness ratios based on a glass core layer thickness compared to a combined glass cladding layer thickness in each portion.

10 Claims, 12 Drawing Sheets

(56) References Cited

U.S. PATENT DOCUMENTS

| | | |
|---|---|---|
| 3,746,526 A | 7/1973 | Giffon |
| 3,849,097 A | 11/1974 | Giffen et al. |
| 3,931,438 A | 1/1976 | Beall et al. |
| 4,102,664 A | 7/1978 | Dumbaugh, Jr. |
| 4,204,027 A | 5/1980 | Simon |
| 4,214,886 A | 7/1980 | Shay et al. |
| 5,342,426 A | 8/1994 | Dumbaugh, Jr. |
| 5,559,060 A | 9/1996 | Dumbaugh et al. |
| 7,201,965 B2 | 4/2007 | Gulati et al. |
| 7,514,149 B2 | 4/2009 | Bocko et al. |
| 7,685,841 B2 | 3/2010 | Boratav et al. |
| 8,007,913 B2 | 8/2011 | Coppola et al. |
| 8,037,716 B2 * | 10/2011 | Aniolek ............... C03B 17/067 65/95 |
| 8,176,753 B2 | 5/2012 | Kahlout et al. |
| 8,726,695 B2 | 5/2014 | Kano et al. |
| 8,794,034 B2 | 8/2014 | Grzesik et al. |
| 9,193,617 B2 | 11/2015 | Kersting et al. |
| 9,399,593 B2 * | 7/2016 | Abramov ............. C03B 33/091 |
| 9,796,616 B2 | 10/2017 | Coppola et al. |
| 2003/0029199 A1 * | 2/2003 | Pitbladdo ............. C03B 17/067 65/195 |
| 2003/0110804 A1 * | 6/2003 | Fenn ................... C03B 17/064 65/195 |
| 2003/0215610 A1 * | 11/2003 | DiGiampaolo ......... C03B 18/06 428/156 |
| 2004/0197575 A1 | 10/2004 | Bocko et al. |
| 2005/0076677 A1 | 4/2005 | Pitbladdo |
| 2005/0160767 A1 * | 7/2005 | Novak .................. C03B 17/064 65/29.21 |
| 2005/0268657 A1 * | 12/2005 | Adamowicz .......... C03B 17/064 65/195 |
| 2006/0016219 A1 * | 1/2006 | Pitbladdo ............. G01F 1/6888 65/29.21 |
| 2006/0236722 A1 | 10/2006 | Delia et al. |
| 2006/0242994 A1 | 11/2006 | Boratav et al. |
| 2007/0062219 A1 * | 3/2007 | Blevins ................ C03B 17/067 65/117 |
| 2007/0140311 A1 * | 6/2007 | House .................. C03B 17/064 65/29.21 |
| 2007/0190340 A1 * | 8/2007 | Coppola ............... C03B 17/064 428/432 |
| 2008/0032111 A1 | 2/2008 | Kamihori et al. |
| 2011/0277504 A1 * | 11/2011 | Pitbladdo ............. C03B 17/067 65/53 |
| 2011/0318555 A1 * | 12/2011 | Bookbinder ............ C03C 3/085 428/428 |
| 2012/0111060 A1 * | 5/2012 | Tsuda .................. C03B 17/064 65/53 |
| 2012/0272688 A1 | 11/2012 | Kano et al. |
| 2013/0133368 A1 * | 5/2013 | Fournel ............... C03B 17/067 65/53 |
| 2013/0133370 A1 | 5/2013 | Boratav et al. |
| 2013/0312459 A1 | 11/2013 | Coppola et al. |
| 2013/0319049 A1 * | 12/2013 | Grzesik ................ C03B 17/064 65/195 |
| 2014/0130549 A1 | 5/2014 | Pitbladdo |
| 2014/0137601 A1 * | 5/2014 | Aburada .............. C03B 17/067 65/29.18 |
| 2014/0141217 A1 * | 5/2014 | Gulati .................... C03B 23/20 428/375 |
| 2014/0238079 A1 | 8/2014 | Amosov et al. |
| 2014/0318182 A1 * | 10/2014 | Coppola ............... C03B 17/067 65/29.21 |
| 2015/0218028 A1 | 8/2015 | Tamamura et al. |
| 2015/0329401 A1 | 11/2015 | Chung et al. |
| 2016/0052818 A1 * | 2/2016 | Golyatin .............. C03B 17/064 65/195 |
| 2016/0102008 A1 * | 4/2016 | Abramov .............. C03B 17/064 65/97 |
| 2016/0115067 A1 * | 4/2016 | De Angelis ............ C03B 5/18 65/195 |
| 2016/0159677 A1 * | 6/2016 | Coppola ................ C03C 3/093 65/195 |
| 2016/0185643 A1 | 6/2016 | Kersting |
| 2016/0297702 A1 * | 10/2016 | Coppola ................ C03B 17/02 |
| 2016/0297703 A1 * | 10/2016 | Aniolek ............... C03B 17/067 |
| 2017/0044041 A1 | 2/2017 | Godard et al. |
| 2017/0197863 A1 | 7/2017 | Lansberry et al. |
| 2017/0282503 A1 * | 10/2017 | Peng ................... C03B 17/064 |
| 2017/0305240 A1 | 10/2017 | Aoki et al. |
| 2018/0194665 A1 | 7/2018 | Buckley et al. |
| 2018/0319695 A1 * | 11/2018 | Amosov ............... C03B 17/068 |
| 2018/0327296 A1 | 11/2018 | Cimo et al. |
| 2018/0327298 A1 * | 11/2018 | Coppola ............... C03B 17/064 |
| 2018/0327299 A1 | 11/2018 | Coppola et al. |
| 2020/0299172 A1 | 9/2020 | Boratav et al. |
| 2021/0163332 A1 | 6/2021 | Amosov et al. |
| 2023/0076980 A1 * | 3/2023 | Coppola ............... C03B 17/064 |

FOREIGN PATENT DOCUMENTS

| | | | |
|---|---|---|---|
| JP | 2013-184877 A | 9/2013 | |
| JP | 2013-216533 A | 10/2013 | |
| JP | 2015-105206 A | 6/2015 | |
| JP | 2015-520108 A | 7/2015 | |
| JP | 2015-528792 A | 10/2015 | |
| KR | 2014-0001744 A | 1/2014 | |
| KR | 10-2014-0015411 A | 2/2014 | |
| KR | 10-1372609 B1 | 3/2014 | |
| TW | 201313629 A | 4/2013 | |
| TW | 201400287 A | 1/2014 | |
| TW | 201439016 A | 10/2014 | |
| WO | 2011/007681 A1 | 1/2011 | |
| WO | 2012/005941 A1 | 1/2012 | |
| WO | 2013/032885 A1 | 3/2013 | |
| WO | 2014/018838 A2 | 1/2014 | |
| WO | WO-2014082000 A1 * | 5/2014 | ........... C03B 17/064 |
| WO | 2014/179248 A1 | 11/2014 | |
| WO | WO-2014186196 A1 * | 11/2014 | ............ C03B 17/02 |
| WO | 2015/016935 A1 | 2/2015 | |

* cited by examiner

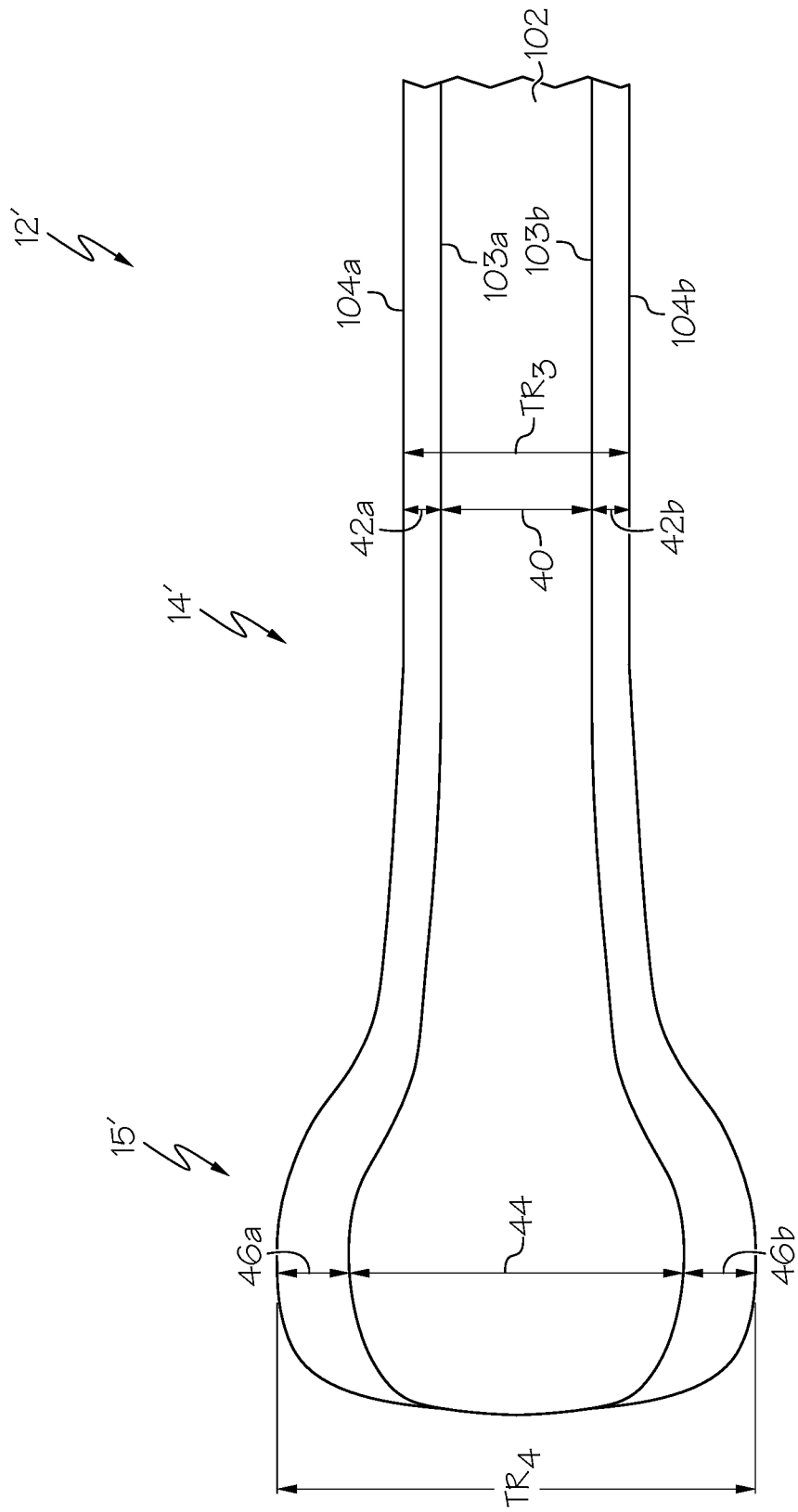

LAMINATED GLASS RIBBONS AND APPARATUSES FOR FORMING LAMINATED GLASS RIBBONS

CROSS-REFERENCE TO RELATED APPLICATIONS

This application is a divisional of U.S. patent application Ser. No. 15/777,543 filed on May 18, 2018, which claims the benefit of priority under 35 U.S.C. § 371 of International Application No. PCT/US2016/062386, filed Nov. 17, 2016, which claims the benefit of priority to U.S. Provisional Application No. 62/258,160, filed Nov. 20, 2015, the content of which is incorporated herein by reference in its entirety.

BACKGROUND

Field

The present specification generally relates to laminated glass ribbons and apparatuses for making laminated glass ribbons, and more specifically, to apparatuses for reducing the attenuation of molten glass flowing between forming bodies of glass forming apparatuses and/or for controlling a thickness ratio across a width of the laminated glass ribbons.

Technical Background

Glass forming apparatuses are commonly used to form various glass products such as laminated glass articles. These laminated glass articles may be used in a variety of applications including, without limitation, as cover glasses in electronic devices such as LCD displays, smart phones, and the like. The laminated glass articles may be manufactured by downwardly flowing streams of molten glass over a series of forming bodies and joining the molten glass streams to form a continuous, laminated glass ribbon. This forming process may be referred to as a fusion process or a laminate fusion process. Various properties of the glass ribbon, such as strength, optical characteristics, and the like, may be controlled by controlling the composition of the molten glass streams flowing over the forming bodies.

As the molten glass cools and solidifies, properties of the glass, such as compressive stress and tension, are fixed in the glass ribbon. While these properties are generally a function of the glass composition, they may also be affected by the actual forming process. Where the forming process results in the development of excessive tension in one portion of the ribbon, there is an increased likelihood that the glass ribbon will spontaneously fracture or "crack out". These crack outs are a significant source of production inefficiencies and contribute to increased product costs.

Accordingly, a need exists for alternative glass forming apparatuses which mitigate glass ribbon failures and thereby improve the stability and efficiency of manufacturing laminated glass articles.

SUMMARY

According to one embodiment, an apparatus for making a laminated glass ribbon may include an upper forming body including an outer forming surface bounded in a lateral direction by a pair of upper dams that are spaced apart from one another to define an upper dam space extending across the outer forming surface, a lower forming body disposed downstream of the upper forming body and including an outer forming surface, the outer forming surface of the lower forming body spaced from the outer forming surface of the upper forming body by an interior gap, and an edge guide disposed along an interior upper dam wall of the pair of upper dams. An upper portion of the edge guide may be positioned within the upper dam space of the upper forming body, a bottom portion of the edge guide disposed in the interior gap and spaced apart from the outer forming surface of the lower forming body.

In another embodiment, an apparatus for making a glass ribbon may include an upper forming body including an outer forming surface bounded in a lateral direction by a pair of upper dams, the upper dams spaced apart from one another to define an upper dam space extending across the outer forming surface of the upper forming body, and a lower forming body disposed downstream of the upper forming body and including an outer forming surface bounded in a lateral direction by a pair of lower dams spaced apart from one another to define a lower dam space extending across the outer forming surface of the lower forming body. The outer forming surface of the upper forming body may be spaced from a the outer forming surface of the lower forming body by an interior gap, and the upper forming body may be joined to the lower forming body (e.g., at portions of the forming bodies exterior to or laterally outboard of the upper dam space and/or the lower dam space).

In another embodiment, a glass ribbon includes a first clad glass layer, a second clad glass layer, and a core glass layer disposed between the first clad glass layer and the second clad glass layer. The glass ribbon includes an inner portion and an edge bead extending in a length direction along an edge of the inner portion and thicker than the inner portion. A thickness ratio is a ratio of a thickness of the glass core layer to a sum of a thickness of the first glass clad layer and a thickness of the second glass clad layer. The thickness ratio at all points across the glass ribbon in a width direction is within about 100% of a mean thickness ratio across the glass ribbon in the width direction.

In another embodiment, a glass ribbon including a core glass layer and a pair of clad glass layers may include an inner portion and an outer portion. The inner portion may include a first combined glass cladding layer thickness and a first glass core layer thickness, the inner portion having a first thickness ratio based on the ratio of the first glass core layer thickness to the first combined glass cladding layer thickness. The outer portion may include a second combined glass cladding layer thickness and a second glass core layer thickness, the outer portion having a second thickness ratio based on the ratio of the second glass core layer thickness to the second combined glass cladding layer thickness. The first thickness ratio may be substantially equal to the second thickness ratio.

Additional features and advantages of the apparatuses and glass ribbons described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 11 schematically depicts a cross section of a glass sheet formed from the glass forming apparatus of FIG. 9;

DETAILED DESCRIPTION

Figure 1:
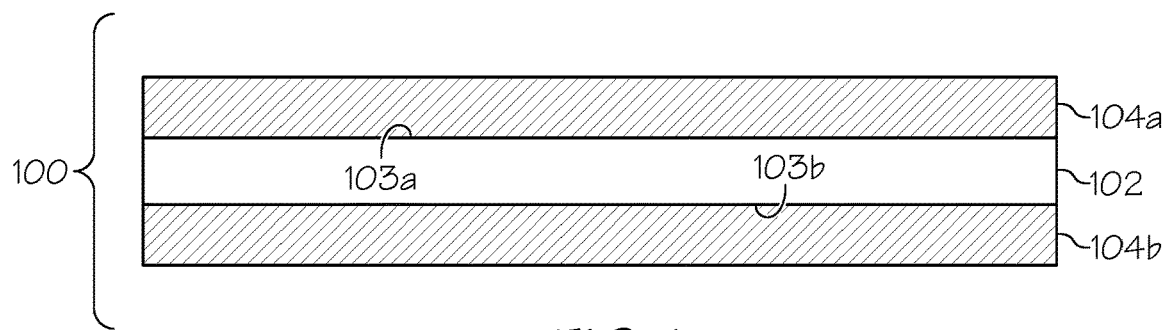
FIG. 1 schematically depicts a cross section of a laminated glass article formed from a laminated glass ribbon, according to one or more embodiments shown and described herein.

Reference will now be made in detail to embodiments of glass forming apparatuses, examples of which are illustrated in the accompanying drawings. Whenever possible, the same reference numerals will be used throughout the drawings to refer to the same or like parts. In embodiments, the glass forming apparatus may include one or more components that reduce the attenuation of glass cladding layers, provide a glass cladding layer width that closely matches the glass core layer width, and/or maintain a thickness ratio of the glass core layer to a combined glass cladding layer (i.e., the sum of the glass cladding layers). Various embodiments of glass forming apparatuses for making laminated glass ribbons will be described in further detail herein with specific reference to the appended drawings.

Referring now to FIG. 1, one embodiment of a laminated glass article 100 is schematically depicted in cross section. The laminated glass article 100 generally includes a glass core layer 102 and a pair of glass cladding layers 104a, 104b. The glass core layer 102 generally includes a first surface 103a and a second surface 103b opposite the first surface 103a. A first glass cladding layer 104a is fused to the first surface 103a of the glass core layer 102 and a second glass cladding layer 104b is fused to the second surface 103b of the glass core layer 102. The glass cladding layers 104a, 104b are fused to the glass core layer 102 without any additional non-glass materials, such as adhesives, coating layers or the like, disposed between the glass core layer 102 and the glass cladding layers 104a, 104b.

In some embodiments of the laminated glass article 100, the glass core layer 102 may be formed from a first glass composition having an average core coefficient of thermal expansion $CTE_{core}$ and the glass cladding layers 104a, 104b are formed from a second, different glass composition which has an average cladding coefficient of thermal expansion $CTE_{clad}$. The $CTE_{core}$ is greater than $CTE_{clad}$ which results in the glass cladding layers 104a, 104b being compressively stressed without being ion exchanged or thermally tempered. As used herein, the term "average coefficient of thermal expansion," or "average CTE," refers to the average coefficient of linear thermal expansion of a given material or layer between 0° C. and 300° C. The average CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

In some other embodiments, the glass core layer 102 and the glass cladding layers 104a, 104b may be formed from different glass compositions which have similar coefficients of thermal expansion but different physical properties. For example and without limitation, the glass core layer 102 may be more or less prone to dissolution in a particular solution than the glass cladding layers 104a, 104b. As another example, the glass core layer 102 and the glass cladding layers 104a, 104b may have different optical characteristics, such as index of refraction or the like.

Further, while FIG. 1 schematically depicts an embodiment of a laminated glass article 100 having three discrete layers of glass, it should be understood that, in other embodiments, the laminated glass article may be formed from two discrete layers of glass or more than three discrete layers of glass.

Figure 2:
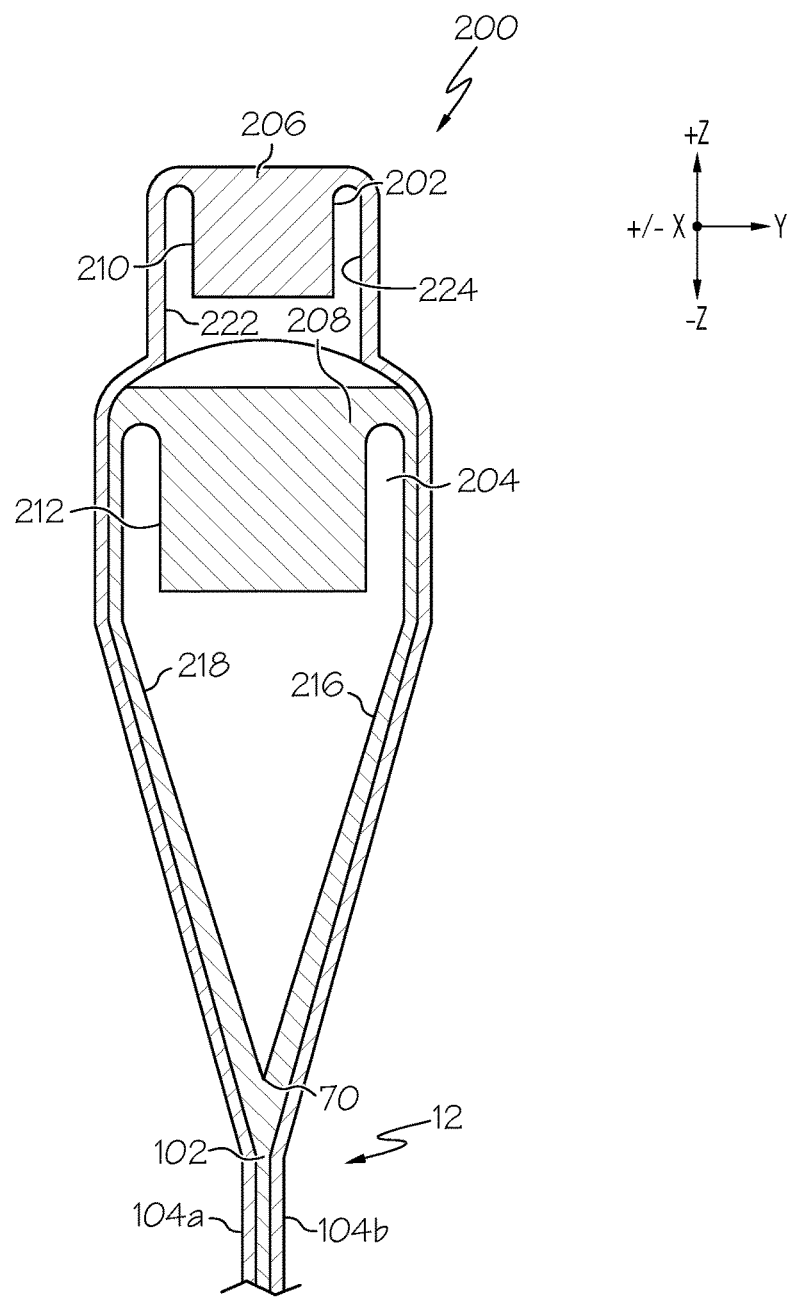
FIG. 2 schematically depicts a glass forming apparatus for making a laminated glass ribbon.

Referring now to FIGS. 1 and 2, the laminated glass article 100 of FIG. 1 may be formed by a fusion lamination process, such as the processes described in U.S. Pat. No. 4,214,886, filed Apr. 5, 1979 and entitled "Forming Laminated Sheet Glass," and International Patent Pub. No. WO2015016935, filed Aug. 2, 2013 and entitled "Apparatus and Method for Producing Laminated Glass Sheet," each of which is incorporated by reference herein in its entirety.

Referring to FIG. 2 by way of example, a glass forming apparatus 200 for forming a laminated glass article includes a first, upper forming body 202 positioned over a second, lower forming body 204. That is, the lower forming body 204 is positioned downstream (i.e., in the −z-direction of the coordinate axes depicted in FIG. 2) of the upper forming body 202. The upper forming body 202 includes a trough 210 into which a molten glass cladding composition 206 is fed from a melter (not shown). Similarly, the lower forming body 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower forming body 204. The outer forming surfaces 216, 218 of the lower forming body 204 converge at a root 70. Accordingly, the molten glass core composition 208 flowing over the outer forming surfaces 216, 218 rejoins at the root 70 of the lower forming body 204 thereby forming a glass core layer 102 of a laminated glass article 100.

Simultaneously, the molten glass cladding composition 206 overflows the trough 210 formed in the upper forming body 202 and flows over outer forming surfaces 222, 224 of the upper forming body 202. The molten glass cladding composition 206 flows around the lower forming body 204 and contacts the molten glass core composition 208 flowing over the outer forming surfaces 216, 218 of the lower forming body 204, fusing to the molten glass core composition 208 and forming glass cladding layers 104a, 104b around the glass core layer 102, thereby forming a laminated glass ribbon 12, from which a laminated glass article 100 may be separated.

As noted hereinabove, in some embodiments, the molten glass core composition 208 may have an average coefficient of thermal expansion $CTE_{core}$ which is greater than the average cladding coefficient of thermal expansion $CTE_{clad}$ of the molten glass cladding composition 206. As the glass core layer 102 and the glass cladding layers 104a, 104b cool, the difference in the coefficients of thermal expansion cause a compressive stresses to develop in the glass cladding layers 104a, 104b due to the CTE mismatch between the glass core layer and the glass cladding layers. The compressive stress increases the strength of the resulting laminated glass article without an ion-exchange treatment or thermal tempering treatment. In some embodiments, the resulting laminated glass article can be subjected to an ion exchange treatment and/or a thermal tempering treatment to modify the stress of the glass cladding layers.

Without the correction described herein with respect to various embodiments, the molten glass flowing over the glass forming apparatus 200 and, more particularly, the molten glass cladding composition 206 flowing over the outer forming surfaces 222, 224 of the upper forming body 202 may be subject to attenuation. As shown in FIG. 2, the upper forming body 202 may be spaced apart from the lower forming body 204. Attenuation occurs as the molten glass flowing from the upper forming body 202 tapers inwardly or contracts (i.e., attenuates) in a width-wise direction (i.e., the width of the molten glass stream is reduced in the +/−x-direction of the coordinate axes depicted in FIG. 2) as the molten glass transitions from the upper forming body 202 to the lower forming body over the interior gap disposed between the forming bodies. The attenuation is due, at least in part, to the spacing between the forming bodies, the drag of the molten glass relative to the forming body (or lack thereof), and the viscosity of the molten glass. The attenuation tends to result in the molten glass cladding composition 206 from the upper forming body 202 forming a thicker glass layer proximate the edges of the laminated glass ribbon. This thickened portion is often referred to as a bead or edge bead. The increased bead thickness proximate the edges may impose a greater tension on the adjacent glass layer formed from the molten glass core composition 208 flowing over the lower forming body due in part to the CTE mismatch and in part to the increased thickness of the edge bead. The increase in tension due to the increased thickness of the edge bead may cause increased stress in the laminated glass ribbon formed with the glass manufacturing apparatus and may cause process instabilities and difficulties in scoring and separating discrete laminated glass articles from the laminated glass ribbon. Additionally, or alternatively, such tension can limit the range of usable core and clad glass compositions by limiting the allowable CTE mismatch and/or viscosity mismatch at the root.

Figure 3:
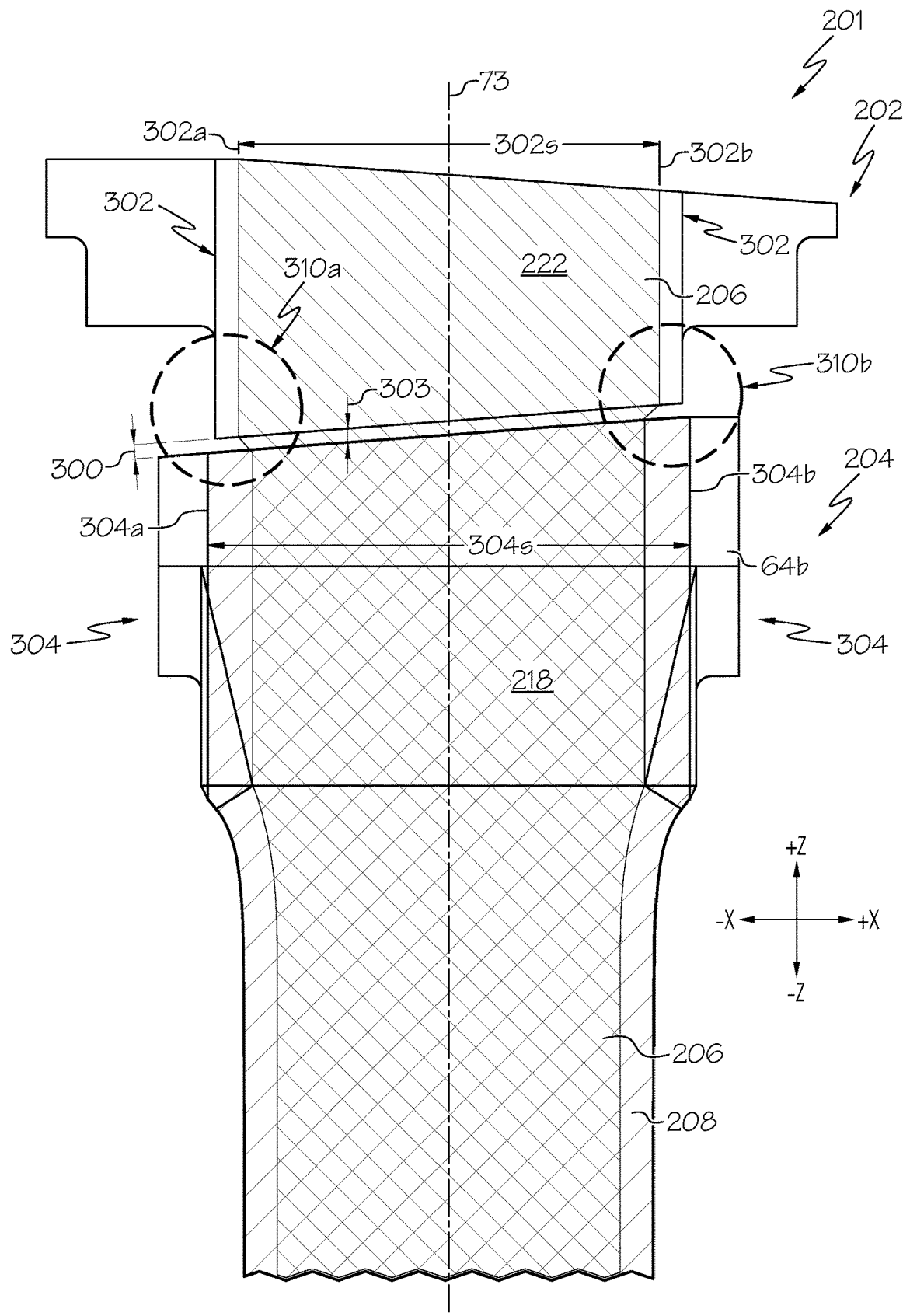
FIG. 3 schematically depicts a glass forming apparatus.

Specifically referring to FIG. 3, a glass forming apparatus 201 is schematically depicted according to one or more embodiments shown and described herein. The glass forming apparatus generally includes an upper forming body 202 and a lower forming body 204 disposed downstream of the upper forming body 202, as described hereinabove. A bottom, interior portion of the upper forming body 202 is spaced from a top, interior portion of the lower forming body 204 by an interior gap 303. In the embodiment of the glass forming apparatus 201 depicted in FIG. 3, a bottom, exterior portion of the upper forming body 202 is spaced from a top, exterior portion of the lower forming body 204 by an exterior gap 300 such that the forming bodies 202, 204 are movable relative to each other (i.e., the upper forming body 202 is moveable relative to the lower forming body 204). For example, in some embodiments, the upper forming body 202 may be tilted with respect to the lower forming body 204 to aid in controlling the flow of the molten glass cladding composition 206 from the upper forming body 202 to the lower forming body 204.

The upper forming body 202 includes an outer forming surface 222 and a pair of upper dams 302 which bound the outer forming surface 222. The upper dams 302 form an upper dam space 302s extending in the width direction (i.e., in the +/−x-direction of the coordinate axes depicted in FIG. 3). The upper dam space 302s extends between interior upper dam walls 302a, 302b of the upper dams 302. The upper dams 302 and, more specifically, the interior upper dam walls 302a, 302b prevent molten glass from running over the lateral edges of the upper forming body 202 during operation of the glass forming apparatus 201. While not shown, the upper forming body 202 may further include a second outer glass forming surface opposite outer forming surface 222 (as described hereinabove with respect to FIG. 2) which may, likewise, include a pair of upper dams forming a dam space.

The lower forming body 204 includes an outer forming surface 218 and a pair of lower dams 304 which bound the outer forming surface 218. The lower dams 304 form a lower dam space 304s extending in the width direction (i.e., in the +/−x-direction of the coordinate axes depicted in FIG. 3). The lower dam space 304s extends between interior lower dam walls 304a, 304b of the lower dams 304. The lower dams 304 and, more specifically, the interior lower dam walls 304a, 304b prevent molten glass from running over the lateral edges of the lower forming body during operation of the glass forming apparatus 201. While not shown, the lower forming body 204 may further include a second outer glass forming surface opposite outer forming surface 218 (as described hereinabove with respect to FIG. 2) which may, likewise, include a pair of lower dams forming a lower dam space.

The outer forming surface 222 of the upper forming body 202 is spaced from the outer forming surface 218 of the lower forming body 204 by the interior gap 303. Superimposed circles 310a, 310b illustrate respective edge areas in which the molten glass cladding composition 206 flows downwardly from the upper forming body 202, across the interior gap 303 toward the lower forming body 204, and onto the molten glass core composition 208 flowing from the lower forming body 204.

Figure 4:
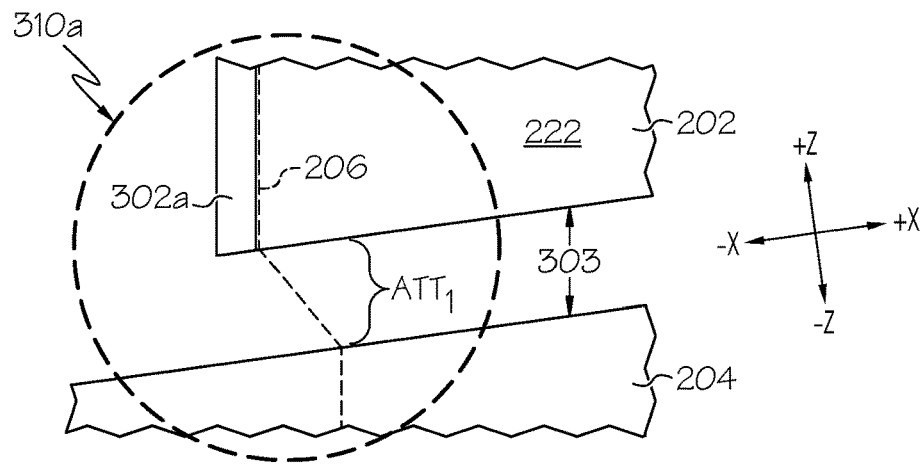
FIG. 4 schematically depicts a close-up view of an interior gap section between upper and lower forming bodies of the glass forming apparatus of FIG. 3, without an edge guide disposed across a portion of the interior gap section.

Referring now to FIG. 4, an enlarged view of the edge area within superimposed circle 310a is schematically depicted. Specifically, FIG. 4 depicts the uncorrected flow path and resultant attenuation of the molten glass cladding composition 206 as the molten glass cladding composition 206 flows over the outer forming surface 222 of the upper forming body 202 and across the interior gap 303 toward the lower forming body 204. As shown in FIG. 4, the molten glass cladding composition 206 flows downwardly (i.e., in the −z-direction of the coordinate axes depicted in FIG. 4) and along interior upper dam wall 302a which guides the molten glass cladding composition 206 and prevents the molten glass cladding composition 206 from flowing over the lateral edge of the upper forming body 202. As the molten glass cladding composition 206 flows off the outer forming surface 222 and across the interior gap 303 from the upper forming body 202 to the lower forming body 204, the decrease in flow resistance combined with the distance of the interior gap and the viscosity of the molten glass cladding composition 206 cause the molten glass cladding composition 206 to attenuate and taper inward (i.e., in the +x-direction of the coordinate axes depicted in FIG. 4), away from the interior upper dam wall 302a, resulting in an attenuation pattern $ATT_1$. More specifically, without further correction, the molten glass cladding composition 206 free falls downwardly into the interior gap 303 and, due to the change in flow resistance, the distance of the drop, and the relatively low viscosity of the molten glass, the molten glass cladding composition 206 tapers inwardly, away from the interior upper dam wall 302a and along a diagonal trajectory until it reaches the top surface of the molten core glass composition flowing over the lower forming body 204. This attenuation results in the formation of thickened edge beads on the molten glass core composition, as described herein.

Figure 5:
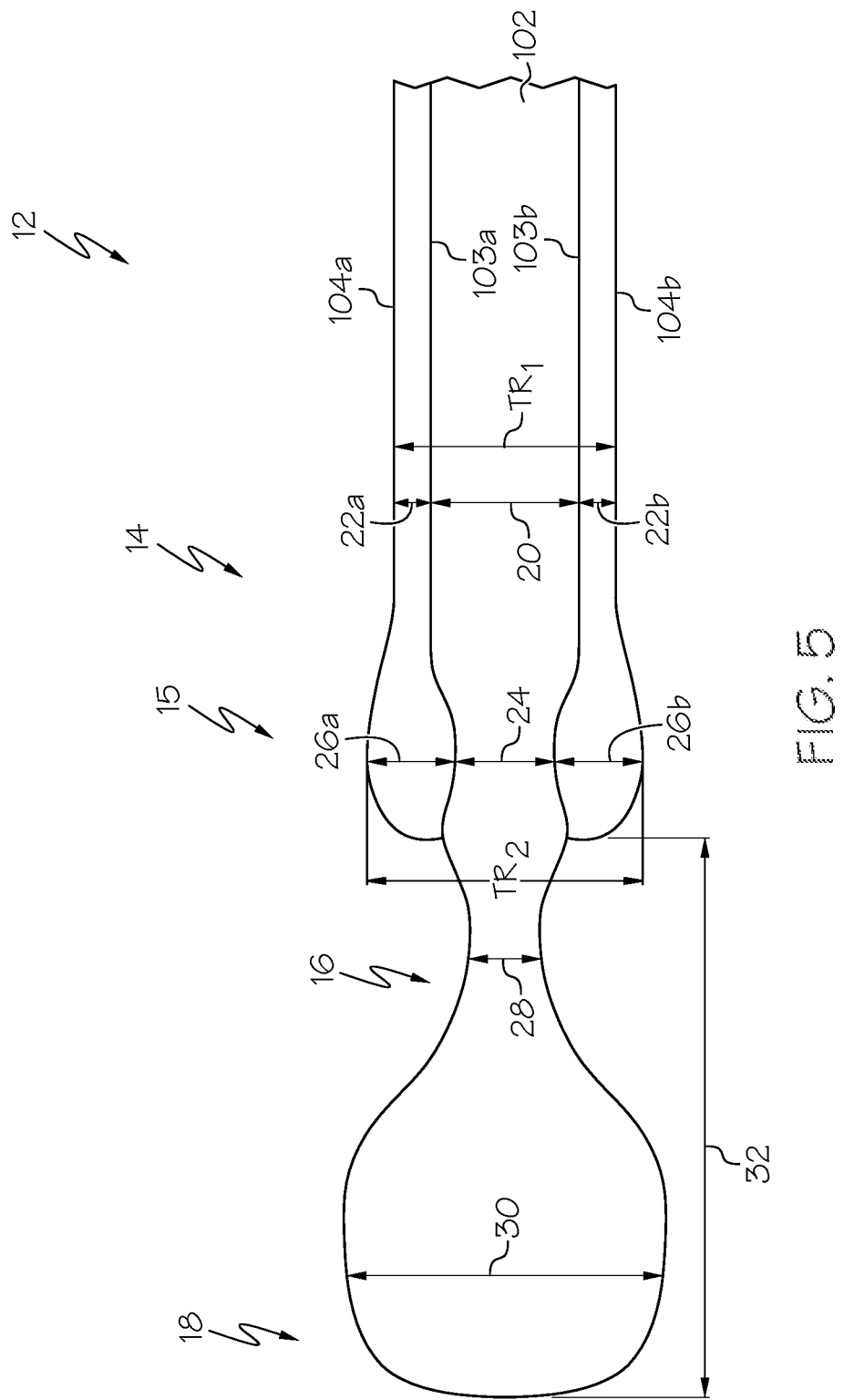
FIG. 5 schematically depicts a cross section of a glass sheet formed from the glass forming apparatus of FIG. 3, without an edge guide disposed across a portion of the interior gap section as shown in FIG. 4.

Referring to FIG. 5 as an example of a laminated glass ribbon formed using the glass forming apparatus 201 and without correcting for the attenuation of the molten glass cladding composition 206 flowing across the interior gap 303, the laminated glass ribbon 12 includes an inner portion 14, an outer portion 15, an exposed core glass neck portion 16, and an exterior exposed core bead portion 18. The inner portion 14 and the outer portion 15 include the glass core layer 102 and first and second glass cladding layers 104a, 104b as described above. At the inner portion 14, the first and second glass cladding layers 104a, 104b form a first combined glass cladding layer thickness that is the sum of glass cladding layer thicknesses 22a and 22b, which may be substantially the same thicknesses. A thickness ratio $TR_1$ is the ratio of a glass core layer thickness 20 of the inner portion 14 to the first combined glass cladding layer thickness (i.e., the sum of glass cladding layer thicknesses 22a and 22b). At the outer portion 15, the first and second glass cladding layers 104a, 104b form a second combined glass cladding layer thickness that is the sum of glass cladding layer thicknesses 26a and 26b and that is greater than the first combined glass cladding layer thickness. A thickness ratio $TR_2$ is the ratio of a glass core layer thickness 24 of the outer portion 15 to the second combined glass cladding layer thickness (i.e., the sum of glass cladding layer thicknesses 26a and 26b). In the embodiment of FIG. 5, the thickness ratio $TR_2$ is substantially less than the thickness ratio $TR_1$ as the glass core layer 102 has decreased in thickness (or thinned out) between the inner portion 14 and the outer portion 15 while the first and second glass cladding layers 104a, 104b have increased in thickness between the inner portion 14 and the outer portion 15 of the glass ribbon 12. Thus, the glass core layer thickness 24 is less than the glass core layer thickness 20, and the second combined glass cladding layer thickness is greater than the first combined glass cladding layer thickness, causing a non-uniformity between thickness ratios $TR_1$, $TR_2$.

As an additional example, attenuation of the molten glass cladding composition 206 forming the cladding layer(s) may result in tension in the core part of the glass ribbon that is not covered by the clad glass. As shown in FIG. 5, the exposed core glass neck portion 16 includes a neck thickness 28, and the exterior exposed core bead portion 18 includes a core bead thickness 30. Generally, due to a viscosity mismatch (e.g., when the clad glass has a higher viscosity than the core glass), as the glass ribbon is drawn, the clad glass thickens to form the clad bead portion 15, and the core glass thins to form the core glass neck portion 16. The exposed core glass neck portion 16 and the exterior exposed core bead portion 18 combine to form an exposed core width 32, which thinned and extended portions result in a high tensile stress region as the glass cools and may result in breakages of the glass ribbon 12. The exposed core width 32 may be, for example, 25 mm to 100 mm, which is large enough for the tensile stress to develop. Such core width may not be of the same order of magnitude as the thickness of the outer portion 15 (i.e., the exposed core width 32 is substantially larger than the thickness of the outer portion 15, which may be, for example, below about 5 mm). Thus, the exposed core layer under high tension may result in spontaneous breakages, dimensional and stability issues, as well as separating difficulties due to the increased thickness of the edge beads from the attenuation of the molten glass cladding composition 206. The embodiments of the glass forming apparatuses described herein may reduce attenuation of the molten glass forming at least one layer of the laminated glass ribbon and/or create uniformity with respect to the thickness ratios of inner and outer portions of the glass ribbon, thereby improving process stability and throughput of the glass forming apparatuses.

Although the glass ribbons shown in FIGS. 5, 11, 13, and 15 comprises three layers, other embodiments are included in this disclosure. In other embodiments, a glass ribbon can have a determined number of layers, such as two, four, or more layers. For example, a glass ribbon comprising two layers can be formed using two forming bodies positioned so that the two layers are joined while traveling away from the respective roots of the forming bodies. A glass article comprising four or more layers can be formed using additional forming bodies. The additional forming bodies can be arranged and configured generally as described herein.

It should be noted that FIGS. 5, 11, 13, and 15 illustrate only a portion of the exemplary glass ribbons described herein. In various embodiments, the glass ribbon comprises a second outer portion or bead portion on an opposing edge of the glass ribbon. The inner portion extends between the opposing outer or bead portions.

In embodiments, the glass forming apparatus 201 may further comprise edge guides which extend from the upper forming body 202 and into the interior gap 303 to mitigate the attenuation of the molten glass cladding composition 206.

Figure 6:
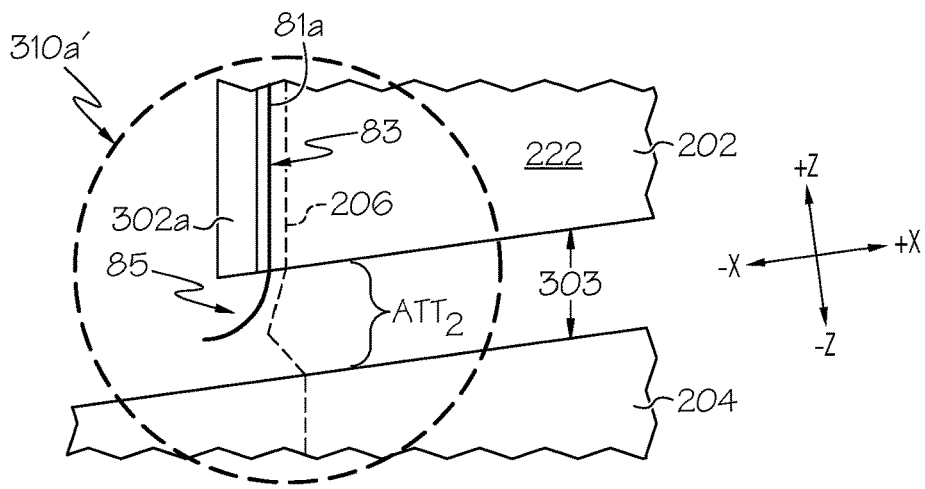
FIG. 6 schematically depicts a close-up view of the interior gap section of FIG. 3 and an embodiment of an edge guide disposed across a portion of the interior gap section, according to one or more embodiments shown and described herein.

For example, FIG. 6 depicts an enlarged view of the edge area within superimposed circle 310a including a curved edge guide 81a. Specifically, the upper forming body 202 includes a curved edge guide 81a which is disposed along the interior upper dam wall 302a. The curved edge guide 81a may be formed from, for example, platinum or platinum-containing metals such as platinum-rhodium, platinum-iridium and combinations thereof. Alternatively, the curved edge guide 81a may be formed from refractory metals such as molybdenum, palladium, rhenium, tantalum, titanium, tungsten, ruthenium, osmium, zirconium, and alloys thereof and/or zirconia. In the embodiment depicted in FIG. 6, the curved edge guide 81a includes an upper portion 83 and a curved bottom portion 85 which is oriented at an angle with respect to the upper portion 83. The curved edge guide 81a is positioned on the upper forming body 202 such that the upper portion 83 of the curved edge guide 81a is aligned with and in contact with the interior upper dam wall 302a. Accordingly, it should be understood that the upper portion 83 of the curved edge guide 81a is positioned in or is directly adjacent to and in contact with the upper dam space of the upper forming body 202. The bottom portion 85 of the curved edge guide 81a extends from the upper forming body 202 at least partially into the interior gap 303. The bottom portion 85 of the curved edge guide 81a flares laterally away from the interior upper dam wall 302a and out of the upper dam space in a lateral direction (i.e., in the −x-direction of the coordinate axes depicted in FIG. 6). In the embodiments described herein, the bottom portion 85 of the curved edge guide 81a may curve away from the upper portion 83 with a constant radius of curvature or a decreasing radius of curvature. While FIG. 6 only depicts the portion of the upper forming body 202 within superimposed circle 310a, it should be understood that a similar edge guide may be affixed to the interior upper dam wall 302b of the upper forming body 202 in the area of superimposed circle 310b.

Still referring to FIG. 6, as the molten glass cladding composition 206 flows downwardly along the interior upper dam wall 302a, the interior upper dam wall 302a guides the molten glass cladding composition 206 onto the upper portion 83 of the curved edge guide 81a. The molten glass cladding composition 206 flows along the upper portion 83 of the curved edge guide 81a and onto the bottom portion 85 of the curved edge guide 81a. The molten glass cladding composition 206 follows the contours of the bottom portion 85 of the curved edge guide 81a in the −x-direction of the coordinate axes depicted in FIG. 6 such that the molten glass cladding composition 206 flows out of and away from the upper dam space until the force of gravity causes the molten glass cladding composition 206 to lose adhesion with the curved edge guide 81a. As the molten glass cladding composition 206 loses adhesion with the curved edge guide 81a, the molten glass cladding composition 206 drops across the interior gap 303 from the upper forming body 202 to the lower forming body 204 until the molten glass cladding composition 206 reaches the top surface of the molten core glass composition flowing over the lower forming body 204. The shape of the curved edge guide 81a results in an attenuation pattern $ATT_2$ in the molten glass cladding composition 206. The attenuation pattern $ATT_2$ has reduced attenuation compared to the attenuation pattern $ATT_1$ due to the curved shape of the edge guide 81a.

Figure 7:
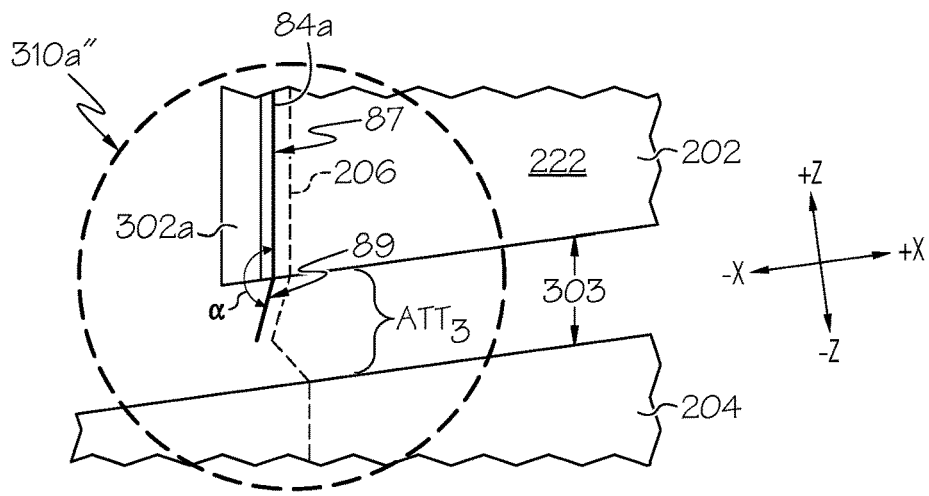
FIG. 7 schematically depicts a close-up view of the interior gap section of FIG. 3 and an embodiment of an edge guide disposed across a portion of the interior gap section, according to one or more embodiments shown and described herein.

While FIG. 6 depicts a curved edge guide 81a, it should be understood that other edge guide configurations are contemplated and possible. For example, FIG. 7 depicts an enlarged view of the edge area within superimposed circle 310a including an angled edge guide 84a. Specifically, the upper forming body 202 includes an angled edge guide 84a which is disposed along the interior upper dam wall 302a. The angled edge guide 84a may be formed from, for example, platinum or platinum-containing metals such as platinum-rhodium, platinum-iridium and combinations thereof. Alternatively, the angled edge guide 84a may be formed from refractory metals such as molybdenum, palladium, rhenium, tantalum, titanium, tungsten, ruthenium, osmium, zirconium, and alloys thereof and/or zirconia. In the embodiment depicted in FIG. 7, the angled edge guide 84a includes an upper portion 87 and an angled bottom portion 89 which is oriented at an angle α with respect to the upper portion 87. The angled bottom portion 89 of the edge guide 84a may be outwardly flared or angled at the angle α away from the upper portion 87. In embodiments, the angle α between the upper portion 87 and the bottom portion 89 may be, for example, from about 90 degrees to about 180 degrees. In some embodiments, the angle α may be at most about 135 degrees, at most about 120 degrees, or at most about 110 degrees. For example, in one particular embodiment, the angle α may be about 100 to about 110 degrees.

The angled edge guide 84a is positioned on the upper forming body 202 such that the upper portion 87 of the angled edge guide 84a is aligned with and in contact with the interior upper dam wall 302a. Accordingly, it should be understood that the upper portion 87 of the angled edge guide 84a is positioned in or is directly adjacent to and in contact with the upper dam space of the upper forming body 202. The bottom portion 89 of the angled edge guide 84a extends from the upper forming body 202 at least partially into the interior gap 303. The bottom portion 89 of the angled edge guide 84a flares laterally away from the interior upper dam wall 302a and out of the upper dam space in a lateral direction (i.e., in the −x-direction of the coordinate axes depicted in FIG. 7). While FIG. 7 only depicts the portion of the upper forming body 202 within superimposed circle 310a, it should be understood that a similar edge guide may be affixed to the interior upper dam wall 302b of the upper forming body 202 in the area of superimposed circle 310b.

Still referring to FIG. 7, as the molten glass cladding composition 206 flows downwardly along the interior upper dam wall 302a, the interior upper dam wall 302a guides the molten glass cladding composition 206 onto the upper portion 87 of the angled edge guide 84a. The molten glass cladding composition 206 flows along the upper portion 87 of the angled edge guide 84a and onto the bottom portion 89 of the angled edge guide 84a. The molten glass cladding composition 206 follows the contours of the bottom portion 89 of the angled edge guide 84a in the −x-direction of the coordinate axes depicted in FIG. 7 such that the molten glass cladding composition 206 flows out of and away from the upper dam space until the force of gravity causes the molten glass cladding composition 206 to lose adhesion with the angled edge guide 84a. As the molten glass cladding composition 206 loses adhesion with the angled edge guide 84a, the molten glass cladding composition 206 drops across the interior gap 303 from the upper forming body 202 to the lower forming body 204 until the molten glass cladding composition 206 reaches the top surface of the molten core glass composition flowing over the lower forming body 204. The shape of the angled edge guide 84a results in an attenuation pattern $ATT_3$ in the molten glass cladding composition 206. The attenuation pattern $ATT_3$ has reduced attenuation compared to the attenuation pattern $ATT_1$ due to the shape of the angled edge guide 84*a*.

Based on FIGS. 6 and 7, it should be understood that edge guides, such as the curved edge guide 81*a* depicted in FIG. 6 and the angled edge guide 84*a* depicted in FIG. 7, may be used to reduce the attenuation of molten glass flowing from an upper forming body 202 to a lower forming body 204. Specifically, the outwardly flared shape of the edge guides directs the flow of the molten glass laterally outward (i.e., away from the centerline 73 (FIG. 3) of the glass forming apparatus 201), mitigating attenuation of the molten glass that would otherwise occur were the edge guides not present (i.e., as depicted in FIG. 4). The use of the edge guides may mitigate the formation of thickened edge beads in the cladding of the resultant laminated glass ribbon, reducing the development of excessive tensile stresses and generally improving the stability of the process of forming a laminated glass ribbon with the glass forming apparatus 201.

Figure 8B:
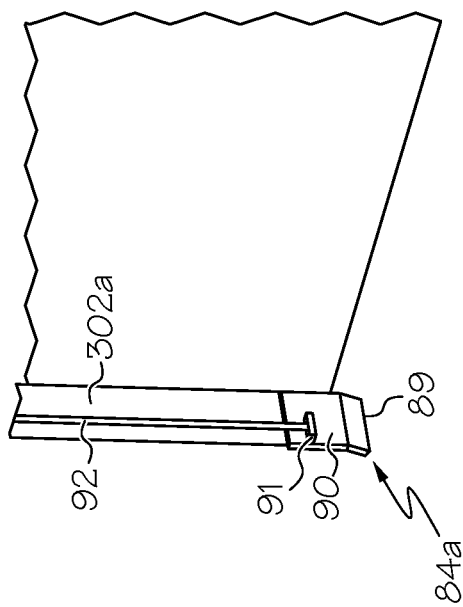
FIG. 8B schematically depicts an inner view of the embodiment of the edge guide of FIG. 7.
Figure 8A:
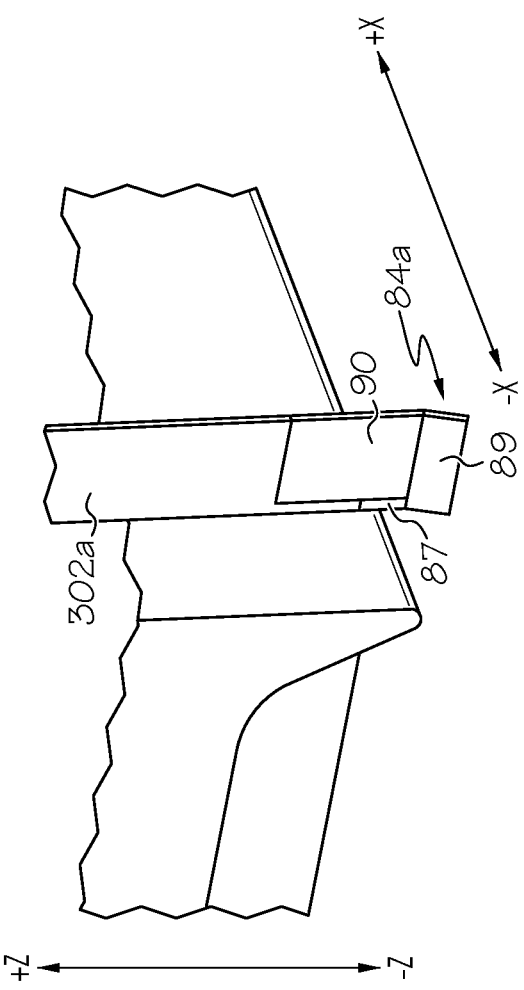
FIG. 8A schematically depicts an outer view of the embodiment of the edge guide of FIG. 7.

In some embodiments, the edge guides may be repositionable with respect to the interior upper dam wall 302*a* and the interior gap 303 to facilitate control over the amount of attenuation that occurs. Referring to FIGS. 8A and 8B by way of example, the edge guide 84*a* may be constructed such that the edge guide 84*a* is slidably mounted on the interior upper dam wall 302*a*. In this embodiment, the upper portion 87 of the edge guide 84*a* may be fitted with a sleeve 90 which wraps around the interior upper dam wall 302*a* such that the edge guide 84*a* is slidable along the interior upper dam wall 302*a* in the +/−z-direction of the coordinate axes depicted in FIG. 8A. To facilitate control of the position of the edge guide 84*a*, the edge guide 84*a* may further comprise an adjustment mechanism. In embodiments, the adjustment mechanism may include, for example, a threaded weld nut 91 attached to the sleeve 90 of the edge guide 84*a*. A threaded rod 92 may be threadably received in the threaded weld nut 91. Rotation of the threaded rod 92 relative to the threaded weld nut 91 moves the edge guide 84*a* in the +/−z-direction depending on the direction of rotation. Alternatively, the weld nut 91 and the rod 92 may not be threaded but may be joined such that the movement of rod 92 causes a movement of the edge guide 84*a* (to which the weld nut 91 is attached) in the +/−z-direction. As another alternative, the rod 92 may be joined directly to the edge guide 84*a* such that the movement of rod 92 causes a movement of the edge guide 84*a* in the +/−z-direction. As other non-limiting examples, the adjustment mechanism causes movement of the edge guide 84*a* in the +/−z-direction or along an axis rotated away from the +/−z-direction should one forming body 202, 204 be moved relative to the other as described in greater detail below. In embodiments, the adjustment mechanism may include a hydraulic or pneumatic cylinder system, a cam and peg system, and rack and pinion system, and/or any other like adjustment mechanism suitable for causing movement of the edge guide 84*a* as described herein.

In embodiments, adjustment of the position of the edge guide 84*a* may be done manually, such as by manually rotating the threaded rod 92. In some other embodiments, adjustment of the position of the edge guide 84*a* may be done automatically, such as when the threaded rod 92 is coupled to an actuator (i.e., a motor or the like (not shown)) and a microcontroller (not shown). The microcontroller may control operation of the actuator and, hence, rotation of the threaded rod. In embodiments, the microcontroller may include a processor and a non-transitory storage medium, such as a memory containing readable and executable instructions. When the instructions are executed by the processor, the microcontroller rotates the threaded rod 92 with the actuator that is communicatively coupled to the microcontroller. Rotation of the threaded rod 92 moves the edge guide 84*a* in either the + or −z-direction, depending on the direction of rotation.

Still referring to FIGS. 8A and 8B, lowering the edge guide 84*a* in the −z-direction further reduces attenuation of the molten glass cladding composition flowing over the upper forming body 202 by inserting the edge guide 84*a* further into the interior gap between the upper and lower forming bodies and spreading the flow of the molten glass cladding composition in the −x-direction as the molten glass cladding composition leaves the upper forming body 202. However, raising the edge guide 84*a* in the +z-direction may increase attenuation of the molten glass cladding composition flowing over the upper forming body 202 as the molten cladding glass composition loses adhesion with the edge guide 84*a* at a higher elevation relative to the lower forming body, allowing the molten glass cladding composition to taper inwardly as it spans the interior gap.

As noted above, the attenuation of the molten glass cladding composition is due, at least in part, to the size of the interior gap 303 between the upper forming body 202 and the lower forming body 204. Referring now to FIGS. 4 and 8A-8B, by way of example and not limitation, the bottom portion 89 of the edge guide 84*a* may be spaced from a top surface of the lower forming body 204 such that a spacing between the molten glass core composition 208 at the top surface of the lower forming body 204 is spaced from the bottom portion 89 of the edge guide 84*a* by less than about 2.54 centimeters. In some embodiments, the bottom portion 89 of the edge guide 84*a* may be spaced from a top surface of the lower forming body 204 such that the molten glass core composition 208 at the top surface of the lower forming body 204 is spaced from the bottom portion 89 of the edge guide 84*a* by greater than 0 centimeters and less than or equal to about 1.27 centimeters. In some other embodiments, the bottom portion 89 of the edge guide 84*a* may be spaced from a top surface of the lower forming body 204 such that the molten glass core composition 208 at the top surface of the lower forming body 204 is spaced from the bottom portion 89 of the edge guide 84*a* by greater than 0 centimeters and less than or equal to about 0.64 centimeters. The aforementioned spacings reduce the drop distance for the molten glass cladding composition 206 between the forming bodies 202, 204 which, in turn, reduces attenuation and produces thinner edge beads that extend over a wider distance of the molten glass core composition.

When one forming body 202, 204 is moved relative to the other forming body 202, 204, either by tilting or adjusting the spacing of the interior gap 303 to address changing process conditions, the position of the edge guides 84*a* may be adjusted to maintain a desired spacing between the bottom portion of the edge guides and the top of the lower forming body 204.

While FIGS. 6 and 7 depict specific embodiments of edge guides, it should be understood that other embodiments of edge guides are contemplated and possible. That is, the edge guides may be constructed with different configurations and/or geometries (including various shapes and sizes) other than those illustrated FIGS. 6 and 7 to accommodate various glass forming apparatus and/or forming vessel configurations while still retaining the functionality of the edge guides for reducing attenuation, as described herein. Further, it should also be understood that the edge guides, may additionally be used with joined forming bodies, such as the forming bodies schematically depicted in FIGS. 9-10B and described below. Like the edge guides, joined forming bodies may also be used to reduce attenuation in the molten glass, with or without the use of edge guides, as will be described in further detail herein.

Figure 9:
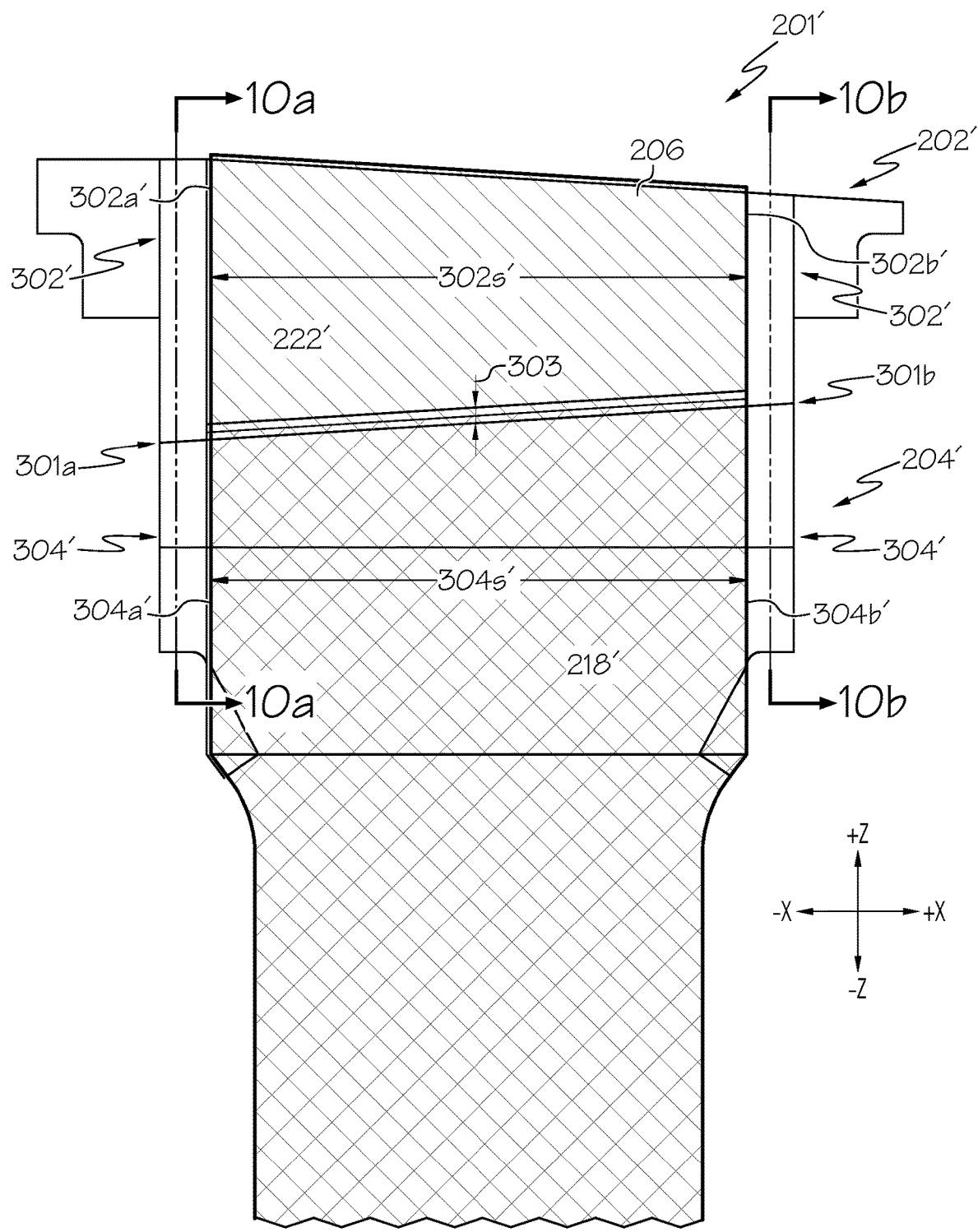
FIG. 9 schematically depicts a glass forming apparatus with a common dam extending between an upper forming body and a lower forming body according to one or more embodiments shown and described herein.

Referring now to FIG. 9 another embodiment of a glass forming apparatus 201' is schematically depicted. The glass forming apparatus 201' includes an upper forming body 202' and a lower forming body 204'. However, in this embodiment, the upper forming body 202' and the lower forming body 204' are joined, thereby eliminating at least a portion of the exterior gap (i.e., the gap outside of the end dams as shown in FIG. 3) while maintaining the interior gap 303 (i.e., the gap inside of or between the end dams as shown in FIGS. 3 and 9). Thus, the upper forming body 202' and the lower forming body 204' are joined at regions exterior to or laterally outboard of the forming surfaces and/or the dam spaces. More specifically, in this embodiment, the glass forming apparatus 201' includes joined exterior ends 301a, 301b extending between the upper forming body 202' and the lower forming body 204'. Constructing the glass forming apparatus 201' such that the upper forming body 202' and the lower forming body 204' are joined at exterior ends 301a, 301b allows for control of the alignment of the dam spaces of the upper forming body 202' and the lower forming body 204' which, in turn, may be used to regulate the attenuation of molten glass flowing between the upper forming body 202' and the lower forming body 204'.

In various embodiments, the upper forming body and the lower forming body may be joined by forming the respective upper and lower forming bodies as a unitary body or by forming the upper and lower forming bodies separately and joining them together. In some embodiments, separate upper and lower forming bodies may be joined using structural components (e.g., as described herein in reference to FIGS. 10A-10B), adhesives (e.g., refractory material used to bond the forming bodies), friction (e.g., by resting the upper forming body on the lower forming body, or another suitable mechanism.

Although the exterior ends 301a, 301b are shown in FIG. 9 as being positioned at opposing outer edges of the upper and lower forming bodies 202', 204', other embodiments are included in this disclosure. For example, in some embodiments, the upper and lower forming bodies extend laterally beyond one or both of the exterior ends at which the bodies are joined to one another. Thus, outer edges of the forming bodies may or may not coincide with exterior ends of the forming surfaces and/or dams. Additionally, or alternatively, outer edges of the forming bodies may or may not be aligned with one another.

Still referring to FIG. 9, the upper forming body 202' includes an outer forming surface 222' and a pair of upper dams 302' which bound the outer forming surface 222'. The upper dams 302' form an upper dam space 302s' extending in the width direction (i.e., in the +/−x-direction of the coordinate axes depicted in FIG. 9). The upper dam space 302s' extends between interior upper dam walls 302a,' 302b' of the upper dams 302. The upper dams 302' and, more specifically, the interior upper dam walls 302a', 302b' prevent molten glass from running over the lateral edges of the upper forming body 202' during operation of the glass forming apparatus 201'. While not shown, the upper forming body 202' may further include a second outer glass forming surface opposite outer forming surface 222' (as described hereinabove with respect to FIG. 2) which may, likewise, include a pair of upper dams forming a dam space.

The lower forming body 204' includes an outer forming surface 218' and a pair of lower dams 304' which bound the outer forming surface 218'. The lower dams 304' form a lower dam space 304s' extending in the width direction (i.e., in the +/−x-direction of the coordinate axes depicted in FIG. 9). The lower dam space 304s' extends between interior lower dam walls 304a', 304b' of the lower dams 304'. The lower dams 304' and, more specifically, the interior lower dam walls 304a', 304b' prevent molten glass from running over the lateral edges of the lower forming body during operation of the glass forming apparatus 201'. While not shown, the lower forming body 204' may further include a second outer glass forming surface opposite outer forming surface 218' (as described hereinabove with respect to FIG. 2) which may, likewise, include a pair of lower dams forming a lower dam space.

In the embodiment of the glass forming apparatus 201' depicted in FIG. 9, the interior upper dam walls 302a', 302b' defining the upper dam space 302s' are aligned with the interior lower dam walls 304a', 304b' defining the lower dam space 304s', such that the upper dam 302' and the lower dam 304' form a common dam which extends from the upper forming body 202' to the lower forming body 204'. In this embodiment, the width of the upper dam space 302s' and the width of the lower dam space 304s' are equal. The use of a common dam which extends from the upper forming body 202' to the lower forming body 204' may facilitate a reduction in or eliminate the attenuation of the molten glass cladding composition 206 flowing over the outer forming surface 222' of the upper forming body 202'.

Specifically, as the molten glass cladding composition 206 overflows the upper forming body 202' and flows over the outer forming surface 222', the molten glass cladding composition 206 contacts the interior upper dam walls 302a', 302b' which prevent the molten glass cladding composition 206 from running over the lateral edges of the upper forming body 202'. In this embodiment, the interior upper dam walls 302a', 302b' also guide the molten glass cladding composition 206 over the interior gap 303 while mitigating attenuation of the molten glass cladding composition 206. As the molten glass cladding composition 206 spans the interior gap 303, the molten glass cladding composition 206 follows and adheres to the interior upper dam walls 302a', 302b' at either end of the interior gap 303 proximate the interior upper dam walls and flows across the interior gap 303 and on to the interior lower dam walls 304a', 304b'. That is, as the molten glass cladding composition 206 transitions over the interior gap 303, the flow of molten glass remains in contact with the interior upper dam walls 302a', 302b' and the interaction between the molten glass cladding composition 206 and the interior upper dam walls 302a', 302b' prevents the molten glass from attenuating inwards as the molten glass cladding composition 206 transitions to the interior lower dam walls 304a', 304b'. Proximate the center of the interior gap 303, the molten glass cladding composition 206 flows across the interior gap 303 from the upper forming body 202' to the lower forming body 204' such that the molten glass cladding composition 206 reaches the top surface of the molten core glass composition flowing over the lower forming body 204', wherein the molten glass cladding composition combines or fuses with the molten glass core composition to form a laminated glass ribbon.

In the embodiment of the glass forming apparatus 201' depicted in FIG. 9 in which the interior upper dam walls 302a', 302b' are aligned with the interior lower dam walls 304a', 304b', the mitigation of attenuation of the molten glass due to the structure of the glass forming apparatus 201' produces a laminated glass ribbon which includes cladding layers which completely cover the core glass layer from edge to edge in the width-wise direction (i.e., in the +/−x-direction of the coordinate axes shown in FIG. 9). Moreover, by mitigating attenuation, the structure of the glass forming apparatus 201' depicted in FIG. 9 also reduces or even mitigates the formation of edge beads on the resulting laminated glass ribbon.

Figure 10B:
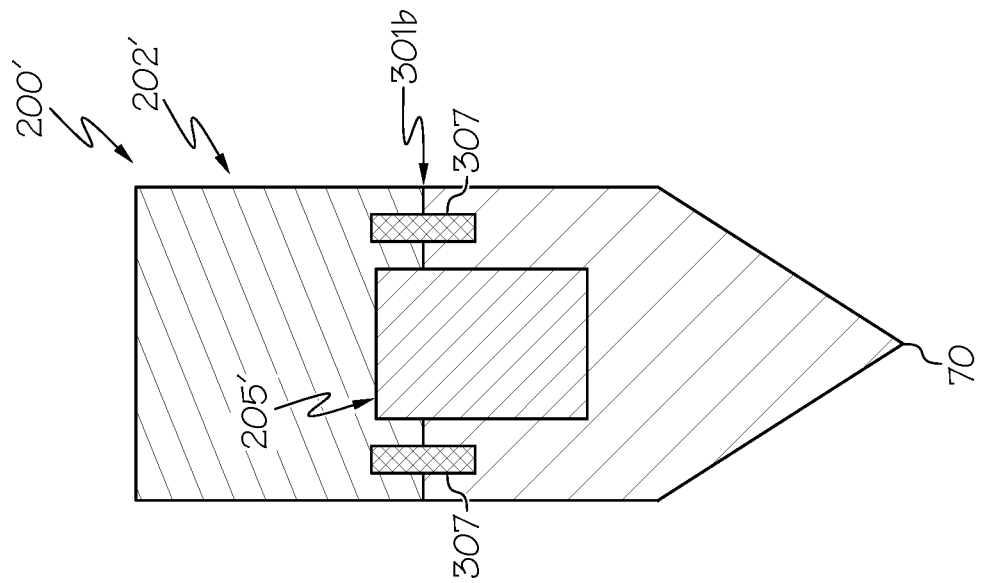
FIG. 10B schematically depicts a cross sectional view along line 10b-10b of the glass forming apparatus of FIG. 9.
Figure 10A:
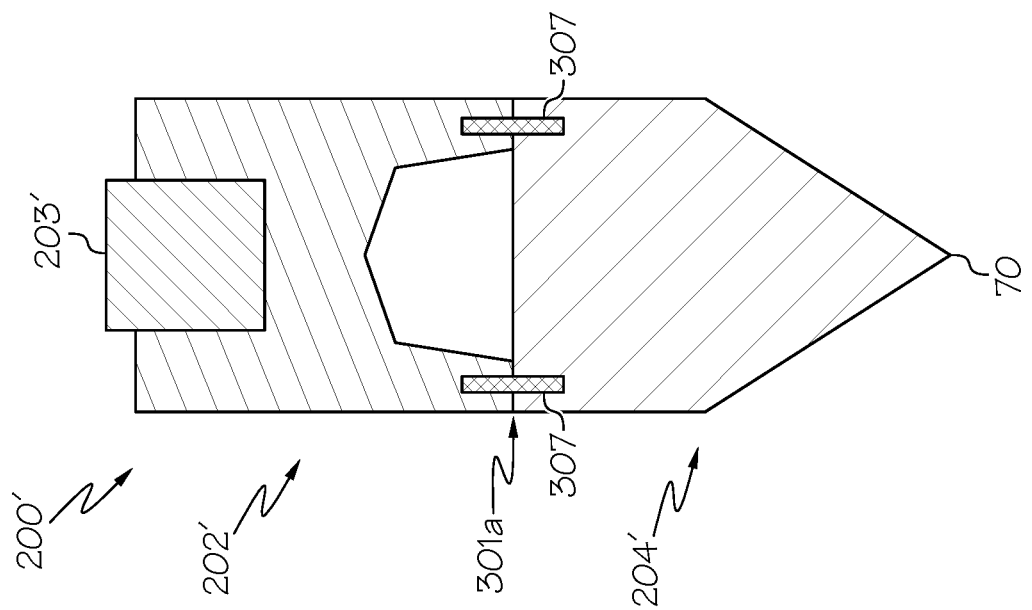
FIG. 10A schematically depicts a cross sectional view along line 10a-10a of the glass forming apparatus of FIG. 9.

Referring now to FIGS. 10A and 10B, cross sections of the glass forming apparatus 201' are schematically depicted along the lines 10a-10a and 10b-10b of FIG. 9. The upper and lower forming bodies of the glass forming apparatuses described herein are generally formed from refractory ceramics, such as zirconia or the like. The size and geometric complexity of the upper and lower forming bodies may necessitate forming the upper and lower forming bodies individually and, thereafter, joining the upper and lower forming bodies together to form the glass forming apparatus 201'. FIGS. 10A and 10B schematically depict one embodiment of structural elements which may be used to join the upper forming body 202' to the lower forming body 204'. In this embodiment, the upper forming body 202' is joined to the lower forming body 204' using structural components 307, such as pins, dowels or the like, which are inserted into bores or slots in the refractory ceramic and align and secure the upper forming body 202' to the lower forming body 204' proximate the exterior ends 301a, 301b of the forming body. Although the upper and lower forming bodies 202', 204' of the glass forming apparatus 201' are shown in FIGS. 10A and 10B has having equal thicknesses (e.g., in the +/−z-directions), other embodiments are included in this disclosure. For example, in other embodiments, the upper forming body can have a greater thickness than the lower forming body or a lesser thickness than the lower forming body.

In various embodiments, upper and lower forming bodies may be joined, for example, by forming the bodies, or portions thereof, separately and joining the separate bodies, or portions thereof, together or by forming the bodies as a unitary structure (e.g., by machining, casting, 3D printing, or another suitable forming process).

Referring to FIG. 11 as an example of a glass ribbon 12 that is formed from the glass forming apparatus of FIG. 9, the laminated glass ribbon 12' includes an inner portion 14' and outer portion 15'. The inner portion 14' and the outer portion 15' include the glass core layer 102 and first and second glass cladding layers 104a, 104b as described above. At the inner portion 14', the first and second glass cladding layers 104a, 104b form a first combined glass cladding layer thickness that is the sum of glass cladding layer thicknesses 42a and 42b, which may be substantially equal in thickness. A thickness ratio $TR_3$ is the ratio of a glass core layer thickness 40 of the inner portion 14' to the first combined glass cladding layer thickness (i.e., the sum of glass cladding layer thicknesses 42a and 42b). At the outer portion 15', the first and second glass cladding layers 104a, 104b form a second combined glass cladding layer thickness that is the sum of glass cladding layer thicknesses 46a and 46b and that is greater than the first combined glass cladding layer thickness. A thickness ratio $TR_4$ is the ratio of a glass core layer thickness 44 of the outer portion 15' to the second combined glass cladding layer thickness (i.e., the sum of glass cladding layer thicknesses 46a and 46b). The thickness ratio $TR_4$ is substantially equal to the thickness ratio $TR_3$. For example, the thickness ratio $TR_4$ is within about 100%, within about 90%, within about 80%, within about 70%, within about 60%, within about 50%, within about 40%, within about 30%, within about 20%, within about 15%, within about 10%, within about 5%, or within about 2% of the thickness ratio $TR_3$. While the glass core layer 102 has increased in thickness between the inner portion 14' and the outer portion 15', the first and second glass cladding layers 104a, 104b have also increased in thickness between the inner portion 14' and the outer portion 15' of the glass ribbon 12 in a manner causing a uniformity between the thickness ratios $TR_3$ and $TR_4$. For example, the thickness ratios $TR_3$ and $TR_4$ may both be in a range of from about 8 to about 10, such as, for example, a ratio of 9.

As FIG. 11 does not include an exposed core width portion, a tension that may be attributable to the core part of the glass ribbon that is not covered by the clad glass is not present at the major surface of the glass ribbon. However, because the core layer is exposed or uncovered by the cladding layers at the outer edge of the glass ribbon, there may be a component of tensile stress that is present at the edge of the glass ribbon. The thickness of the outer portion 15' may be, for example, below about 5 mm, such as 2.5 mm.

In various embodiments, the glass ribbon comprises a first clad glass layer, a second clad glass layer, and a core glass layer disposed between the first clad glass layer and the second clad glass layer as described herein. The glass ribbon comprises an inner portion and an edge bead extending in a length direction (e.g., the +/−z-direction) along an edge of the inner portion. The edge bead is thicker than the inner portion. A thickness ratio of the glass ribbon comprises a ratio of a thickness of the glass core layer to a sum of a thickness of the first glass clad layer and a thickness of the second glass clad layer. In some embodiments, the thickness ratio at all points across the glass ribbon in a width direction (e.g., the +/−x-direction) is within about 100%, within about 90%, within about 80%, within about 70%, within about 60%, within about 50%, within about 40%, within about 30%, within about 20%, within about 15%, within about 10%, within about 5%, or within about 2% of a mean thickness ratio across the glass ribbon in the width direction. Thus, the thickness ratio is substantially constant across the width of the glass ribbon. For example, the thickness ratio can be plotted as a function of position along the glass ribbon in the width direction (e.g., position along the x-axis), and the mean thickness ratio can be calculated as the mean value of the function. In some embodiments, the mean thickness ratio is from about 1 to about 10. Additionally, or alternatively, the width direction is perpendicular to the length direction. Additionally, or alternatively, the edge bead comprises a first edge bead extending in the length direction along a first edge of the inner portion and a second edge bead extending in the length direction along a second edge of the inner portion.

Figure 12:
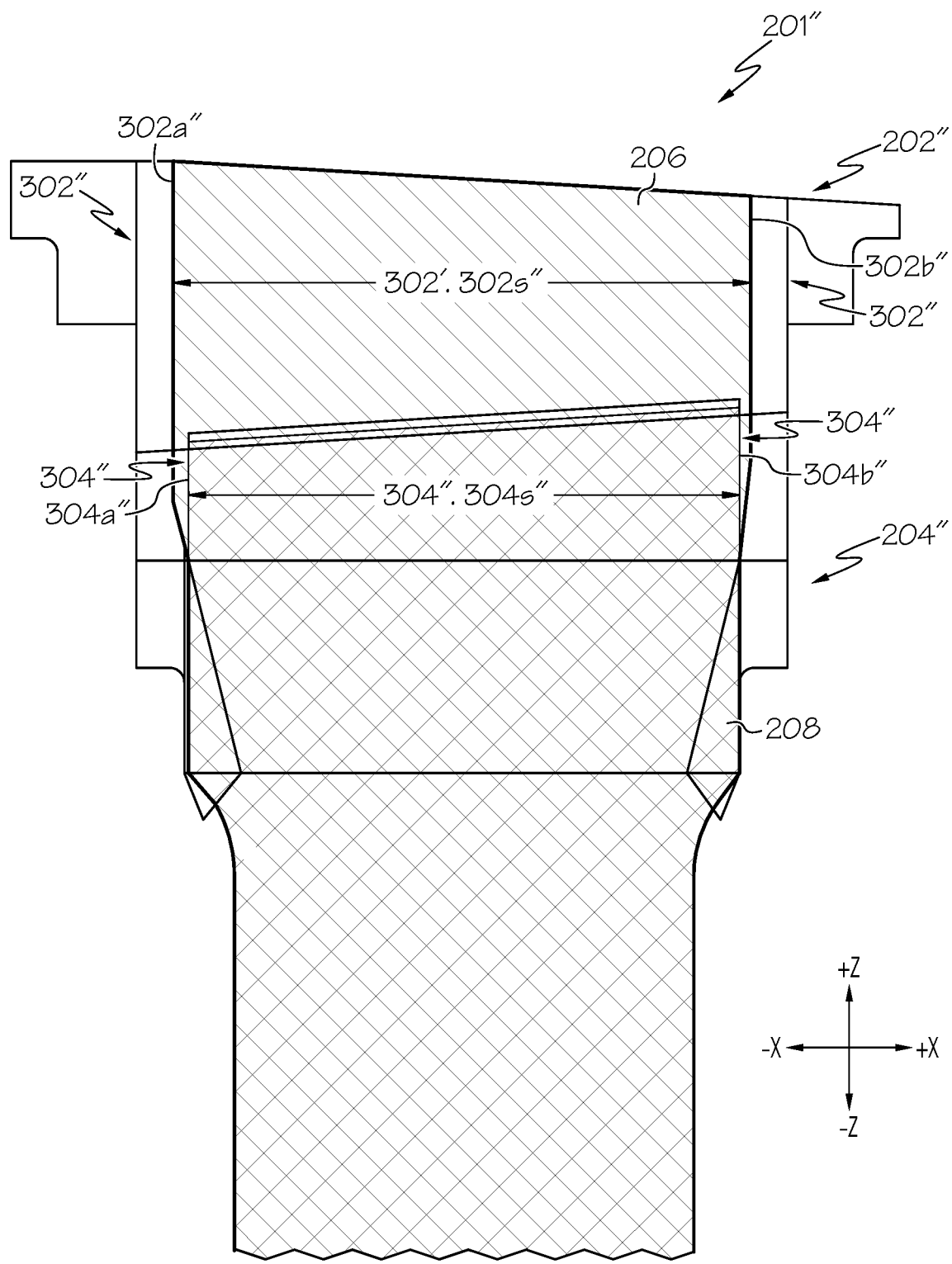
FIG. 12 schematically depicts another glass forming apparatus in which a dam space of the upper forming body is larger than a dam space of the lower forming body, according to one or more embodiments shown and described herein.

FIG. 12 illustrates another embodiment of a glass forming apparatus 201". In this embodiment, the upper forming body 202" and the lower forming body 204" are joined together as described above with respect to FIGS. 9 and 10A-10B. However, in this embodiment, the interior upper dam walls 302a", 302b" of the upper dams 302" are positioned outboard of the interior lower dam walls 304a", 304b" of the lower dams 304" such that the upper dam space 302s" is wider than the lower dam space 304s". As a non-limiting example, the interior upper dam walls 302a", 302b" may be about 1.27 centimeters or even about 2.54 centimeters outboard of the interior lower dam walls 304a", 304b". The larger upper dam space 302s" allows the molten glass cladding composition 206 flowing over the upper forming body 202" to transition over the interior gap without attenuating, as described above with respect to FIG. 9. In addition, the interior lower dam walls 304a", 304b" may be angled or tapered inwards such that a width of the lower dam space 304s" decreases in the −z-direction of the coordinate axes depicted in FIG. 12. The angled interior lower dam walls 302 further reduce the width of the molten glass cladding composition 206 flowing over the lower forming body 204", increasing the flow density of the molten glass to be similar to the flow density of the molten glass core composition 208. With this embodiment of the glass forming apparatus 201", the molten glass cladding composition fully encapsulates the molten glass core composition such that the core layer of the laminated glass ribbon (and therefore the central tension of the core layer) is not exposed.

Figure 13:
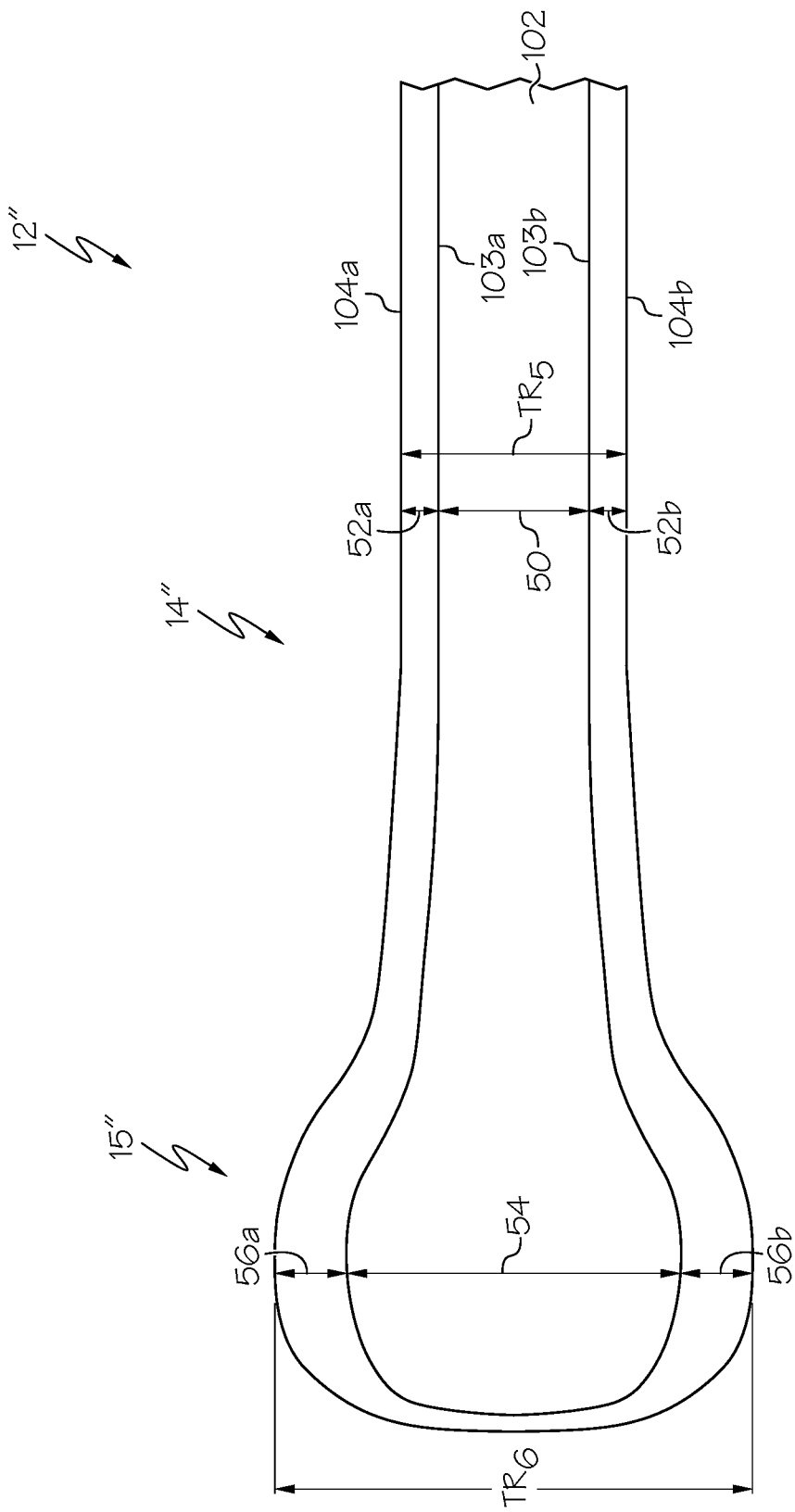
FIG. 13 schematically depicts a cross section of a glass sheet formed from the glass forming apparatus of FIG. 12.

Referring to FIG. 13 as an example of a glass ribbon 12 that is formed from the glass forming apparatus of FIG. 12, the laminated glass ribbon 12" includes an inner portion 14", and outer portion 15". The inner portion 14" and the outer portion 15" include the glass core layer 102 and first and second glass cladding layers 104a, 104b as described above. At the inner portion 14", the first and second glass cladding layers 104a, 104b form a first combined glass cladding layer thickness that is the sum of glass cladding layer thicknesses 52a and 52b, which may be substantially the same thickness. A thickness ratio $TR_5$ is the ratio of a glass core layer thickness 50 of the inner portion 14" to the first combined glass cladding layer thickness (i.e., the sum of glass cladding layer thicknesses 52a and 52b). At the outer portion 15", the first and second glass cladding layers 104a, 104b form a second combined glass cladding layer thickness that is the sum of glass cladding layer thicknesses 56a and 56b and that is greater than the first combined glass cladding layer thickness. A thickness ratio $TR_6$ is the ratio of a glass core layer thickness 44 of the outer portion 15" to the second combined glass cladding layer thickness (i.e., the sum of glass cladding layer thicknesses 56a and 56b). In the embodiment of FIG. 13, the thickness ratio $TR_6$ is substantially equal to the thickness ratio $TR_5$ (i.e., equal to or substantially equal to referring to within reasonable tolerances as described herein). While the glass core layer 102 has increased in thickness between the inner portion 14" and the outer portion 15", the first and second glass cladding layers 104a, 104b have also increased in thickness between the inner portion 14" and the outer portion 15" of the glass ribbon 12 resulting in a uniformity between the thickness ratios $TR_5$, $TR_6$. For example, the thickness ratios $TR_5$, $TR_6$ may both be in a range of from about 8 to about 10, such as a ratio of 9.

Similar to FIG. 11, the glass ribbon of FIG. 13 does not include an exposed core width portion, and a tension that may be attributable to the core part of the glass ribbon that is not covered by the clad glass is generally non-present. Indeed, as described above, with the glass forming apparatus 201", the molten glass cladding composition fully encapsulates the molten glass core composition as shown in FIG. 13 such that the core layer of the laminated glass ribbon (and therefore the central tension of the core layer) is not exposed. Similar to the embodiment of FIG. 11, the thickness of the outer portion 15''' may be, for example, less than about 5 mm, such as 2.5 mm.

Because the core layer is fully encapsulated within the cladding layers, the glass ribbon of FIG. 13 may enable a wider range of CTE mismatch and/or viscosity mismatch compared to the glass ribbon of FIG. 11. However, during forming of the glass ribbon of FIG. 13, the clad glass may contact the interior lower dam walls 304a", 304b" of the lower forming body 204". Thus, the liquidus viscosity of the clad glass should be sufficiently high to avoid devitrification of the clad glass upon contact with the interior dam walls of the lower forming body. Accordingly, the glass ribbon of FIG. 11 may enable a wider range of clad glass liquidus viscosities compared to the glass ribbon of FIG. 13.

Figure 14:
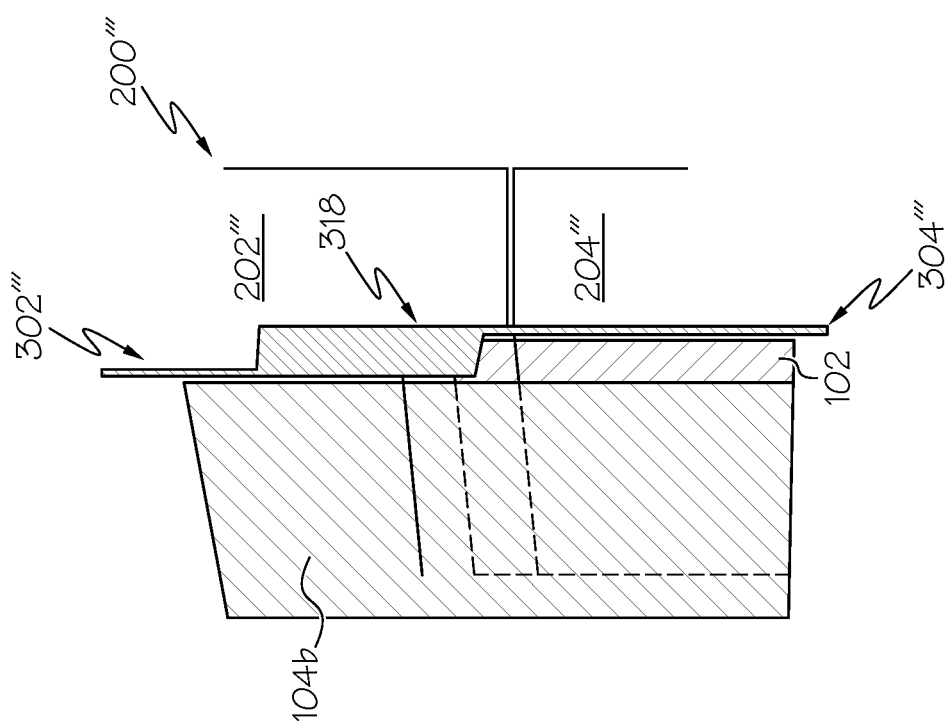
FIG. 14 schematically depicts a close-up view of an interior gap section of another glass forming apparatus in which a dam space of the upper forming body is smaller than a dam space of the lower forming body, according to one or more embodiments shown and described herein.

In an alternative embodiment, as shown in FIG. 14, the upper forming body 202''' may be constructed with upper dams 302''' having interior upper dam walls that are located inboard of the interior lower dam walls of the lower forming body 204''' such that an upper dam space has a width that is less than the lower dam space. As a non-limiting example, the first dam 302''' may be about 0.5 centimeters, about 0.6 centimeters, about 1.27 centimeters, or even about 2.54 centimeters inboard of the second dam 304''', including ranges within these values. The first and second dams 302''', 304''' may be spaced apart at portions, and may be joined at an intermediate section between the upper and lower forming bodies 202''', 204''' by, for example, a joining region 318. The joining region 318 may be made of a platinum sheet or of the same material from which the upper and lower forming bodies 202''', 204''' are formed. The first and second dams 302''', 304''' may be formed of a platinum sheet having a thickness of, for example, 1 mm. In this embodiment, the molten glass cladding composition 206 does not contact the interior lower dam walls (defined by lower dams 304''') as the molten glass cladding composition 206 flows onto the molten glass core composition 208. This prevents crystallization of the molten glass cladding composition 206 when the liquidus temperature of the composition is lower than the temperature of the lower dams 304' or other components of the lower forming body 204'.

Figure 15:
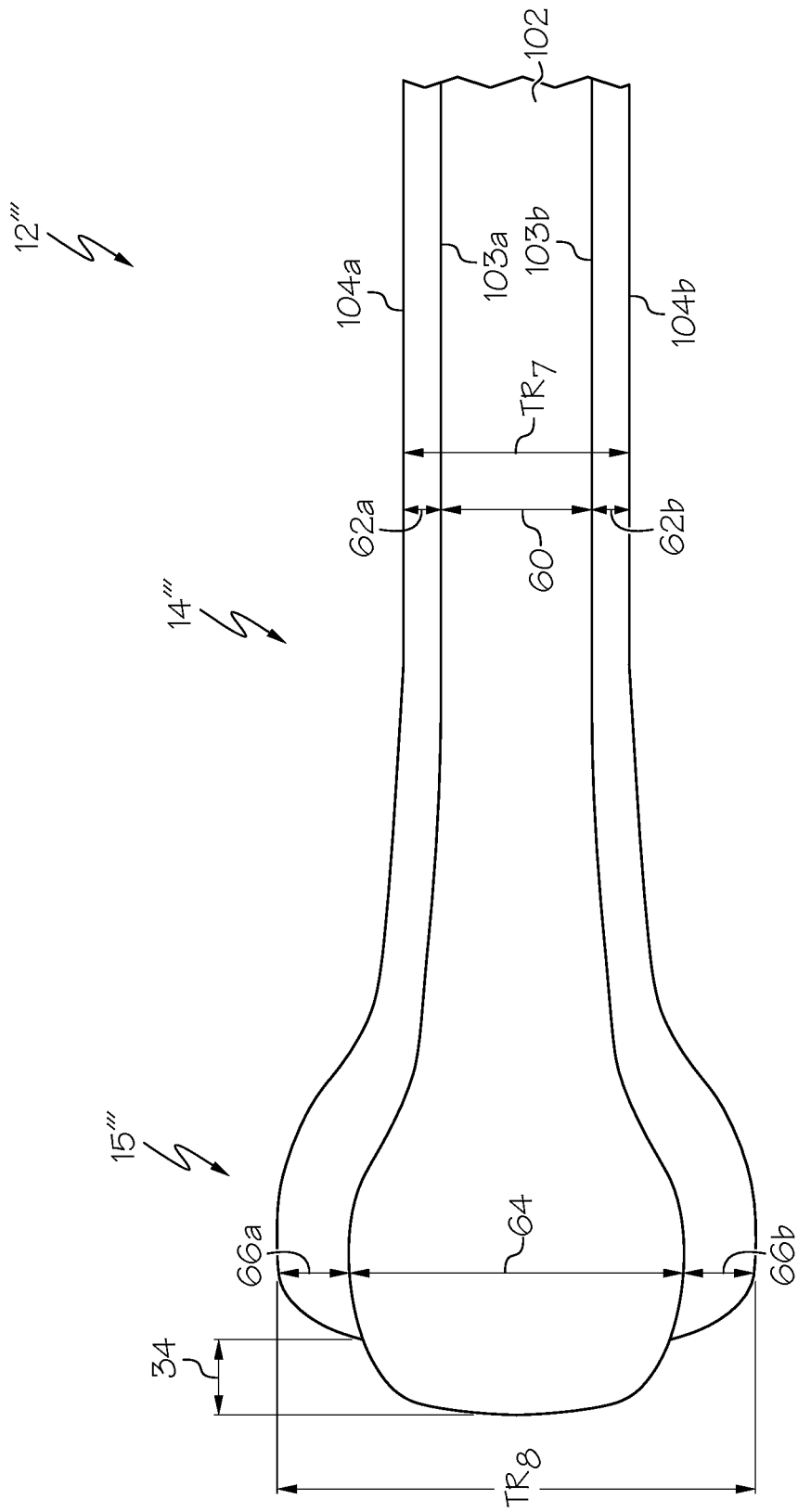
FIG. 15 schematically depicts a cross section of a glass sheet formed from the glass forming apparatus of FIG. 14.

For example, referring to FIG. 15, a laminated glass ribbon 12''' formed from the glass forming apparatus of FIG. 14 includes an inner portion 14''', an outer portion 15''', and an exposed core bead portion that has an exposed core width 34. The inner portion 14''' and the outer portion 15''' include the glass core layer 102 and first and second glass cladding layers 104a, 104b as described above. At the inner portion 14''', the first and second glass cladding layers 104a, 104b form a first combined glass cladding layer thickness that is the sum of glass cladding layer thicknesses 62a and 62b, which may be substantially equal thicknesses. A thickness ratio $TR_5$ is the ratio of a glass core layer thickness 60 of the inner portion 14''' to the first combined glass cladding layer thickness (i.e., the sum of glass cladding layer thicknesses 62a and 62b). At the outer portion 15''', the first and second glass cladding layers 104a, 104b form a second combined glass cladding layer thickness that is the sum of glass cladding layer thicknesses 66a and 66b and that is greater than the first combined glass cladding layer thickness. A thickness ratio $TR_8$ is the ratio of a glass core layer thickness 64 of the outer portion 15''' to the second combined glass cladding layer thickness (i.e., the sum of glass cladding layer thicknesses 66a and 66b). In the glass ribbon of FIG. 15, the thickness ratio $TR_8$ is substantially equal to the thickness ratio $TR_7$. While the glass core layer 102 has increased in thickness between the inner portion 14''' and the outer portion 15''', the first and second glass cladding layers 104a, 104b have also increased in thickness between the inner portion 14''' and the outer portion 15''' of the glass ribbon 12''' in a manner causing a uniformity between the thickness ratios $TR_7$, $TR_8$. For example, the thickness ratios $TR_7$, $TR_8$ may both be in a range of from about 8 to about 10, such as a ratio of 9.

While the glass ribbon of FIG. 15 includes an exposed core width portion, a tension that may be attributable to the core part of the glass ribbon that is not covered by the clad glass is generally small or non-existent as the exposed core width 34 is of the same order of magnitude as the thickness of the outer portion 15'''. For example, the exposed core width 34 may be in a range of from about 2 to about 3 mm, and the thickness of the outer portion 15''' may be, for example, less than about 5 mm, such as at about 2.5 mm. As a non-limiting example, as tension of the core glass within a core/clad laminated glass article is reduced, a higher mismatched CTE and/or viscosity pairing of the core/clad glasses is available without reaching a level of tension at the glass surface sufficient to cause increased probability of glass breakage and while improving glass forming process stability. Further, the amount of the exposed core width 34 may be minimized by restricting the flow density of a portion of the glass core layer 102 that is near the lower dams 304''' (i.e., the exposed portion of the glass core layer 102 that is not covered by the first and second glass cladding layers 104a, 104b). For example, while keeping the first and second glass cladding layers 104a, 104b away from the lower dams 304'' that form the glass core layer 102, a clad edge guide such as the joining region 318 may be engaged with the glass core layer 102 as shown in FIG. 14 to restrict the flow density of the exposed portions of the glass core layer 102.

It should now be understood that the embodiments of the glass forming apparatuses described herein may be used to reduce the attenuation of molten glass cladding flowing between forming bodies in a fusion lamination process. By reducing the attenuation of the molten glass cladding, a laminated glass ribbon having a greater usable width may be obtained. Further, by reducing the attenuation of the molten glass cladding composition, tension in the core portion at the edges or beads of the laminated glass article is reduced, allowing for the use of glass pairings with greater CTE (and/or viscosity) mismatches without reaching a level of tension at the glass surface sufficient to cause increased probability of glass breakage and while improving glass forming process stability. Additionally, uniformity between thickness ratios of inner and outer portions of the formed glass ribbons is obtained causing any exposed core portion that may be present to be of the same order of magnitude as the thickness of the outer portion of a respective glass ribbon, thus reducing tensile stresses in the exposed core portion.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass ribbon comprising:
   a first clad glass layer and a second clad glass layer;
   a core glass layer disposed between the first clad glass layer and the second clad glass layer;
   an inner portion and an edge bead extending in a length direction along an edge of the inner portion and thicker than the inner portion, each of the inner portion and the edge bead comprising the core glass layer and the first and second clad glass layers; and
   a thickness ratio comprising a ratio of a thickness of the glass core layer to a sum of a thickness of the first glass clad layer and a thickness of the second glass clad layer, wherein the thickness ratio at all points across an entirety of the glass ribbon in a width direction is within 100% of a mean thickness ratio across the glass ribbon in the width direction, and
   wherein, when viewed along the width direction in a cross section through the edge bead, an outermost portion of the core glass layer is flush with or covered by an outermost portion of the first and second clad glass layers.

2. The glass ribbon of claim 1, wherein the mean thickness ratio is from 1 to 10.

3. The glass ribbon of claim 1, wherein the width direction is perpendicular to the length direction.

4. The glass ribbon of claim 1, wherein the edge bead comprises a first edge bead extending in the length direction along a first edge of the inner portion and a second edge bead extending in the length direction along a second edge of the inner portion.

5. A glass ribbon including a core glass layer and a pair of clad glass layers, the glass ribbon comprising:
   an inner portion and an edge bead;
   the inner portion comprising a first combined glass cladding layer thickness and a first glass core layer thickness, the inner portion having a first thickness ratio based on the ratio of the first glass core layer thickness to the first combined glass cladding layer thickness;
   the edge bead comprising a second combined glass cladding layer thickness and a second glass core layer thickness, the edge bead having a second thickness ratio based on the ratio of the second glass core layer thickness to the second combined glass cladding layer thickness;
   wherein a difference between the first thickness ratio and the second thickness ratio is less than or equal to 2,
   wherein, when viewed along the width direction in a cross section through the edge bead, an outermost portion of the core glass layer is flush with or covered by an outermost portion of the first and second clad glass layers.

6. The glass ribbon of claim 5, wherein the first thickness ratio and the second thickness ratio are equal to a range of from about 8 to about 10.

7. The glass ribbon of claim 5, wherein the second combined glass cladding layer thickness is greater than the first combined glass cladding layer thickness, and the second glass core layer thickness is greater than the first glass core layer thickness.

8. A glass ribbon comprising:
   a first clad glass layer and a second clad glass layer;
   a core glass layer disposed between the first clad glass layer and the second clad glass layer;
   an inner portion and an edge bead extending in a length direction along an edge of the inner portion and thicker than the inner portion, each of the inner portion and the edge bead comprising the core glass layer and the first and second clad glass layers; and
   a thickness ratio comprising a ratio of a thickness of the glass core layer to a sum of a thickness of the first glass clad layer and a thickness of the second glass clad layer, wherein the thickness ratio at all points across an entirety of the glass ribbon in a width direction is within 100% of a mean thickness ratio across the glass ribbon in the width direction, and
   wherein, when viewed along the width direction in a cross section through the edge bead, the core glass layer has an exposed core width portion that extends outwardly from an outermost portion of the first and second clad glass layers, the exposed core width portion having an exposed core width in the width direction that is less than a thickness of the edge bead.

9. The glass ribbon of claim 8, wherein the exposed core width is equal to or less than about 80% of the thickness of the edge bead.

10. The glass ribbon of claim 9, wherein the exposed core width is in a range of about 40% to about 80% of the thickness of the edge bead.

* * * * *